(12) United States Patent
Hecht

(10) Patent No.: US 11,995,621 B1
(45) Date of Patent: May 28, 2024

(54) SYSTEMS AND METHODS FOR NATIVE, NON-NATIVE, AND HYBRID REGISTRATION AND USE OF TAGS FOR REAL-TIME SERVICES

(71) Applicant: Wells Fargo Bank, N.A., San Francisco, CA (US)

(72) Inventor: Alan W. Hecht, Chanhassen, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/970,780

(22) Filed: Oct. 21, 2022

Related U.S. Application Data

(60) Provisional application No. 63/270,718, filed on Oct. 22, 2021.

(51) Int. Cl.
*G06Q 20/20* (2012.01)
*G06Q 20/10* (2012.01)

(52) U.S. Cl.
CPC .................................. *G06Q 20/10* (2013.01)

(58) Field of Classification Search
CPC ...................................................... G06Q 20/20
See application file for complete search history.

(56) References Cited

U.S. PATENT DOCUMENTS

| | | | |
|---|---|---|---|
| 5,412,192 A | 5/1995 | Hoss | |
| 5,778,067 A | 7/1998 | Jones et al. | |
| 5,953,710 A | 9/1999 | Fleming | |
| 6,016,484 A | 1/2000 | Williams et al. | |
| 6,353,811 B1 | 3/2002 | Weissman | |
| 6,615,194 B1 | 9/2003 | Deutsch et al. | |
| 6,865,547 B1 | 3/2005 | Brake et al. | |
| 6,873,974 B1 | 3/2005 | Schutzer | |
| 6,993,510 B2 | 1/2006 | Guy et al. | |

(Continued)

FOREIGN PATENT DOCUMENTS

| | | |
|---|---|---|
| JP | 2002-312554 A | 10/2002 |
| KR | 20090014076 A | 2/2009 |

(Continued)

OTHER PUBLICATIONS

"Authors et al., Secure Authorization Token, Sep. 18, 2013, IP.com PAD, entire document" (Year: 2013).

(Continued)

*Primary Examiner* — William E Rankins
(74) *Attorney, Agent, or Firm* — Foley & Lardner LLP

(57) ABSTRACT

A computer-implemented method includes receiving, by a provider computing system, a transfer tag associated with a recipient from a user device associated with a sender. The computer-implemented method further includes performing, by the provider computing system, a tag conversion process on the transfer tag to create a tag-based identifier corresponding to the transfer tag. The computer-implemented method further includes generating, by the provider computing system, a transfer request including the tag-based identifier. The computer-implemented method further includes sending, by the provider computing system, the transfer request to a transfer service computing system, the transfer request initiating a transfer of a resource to a recipient account of the recipient based on the tag-based identifier.

14 Claims, 8 Drawing Sheets

(56) References Cited

U.S. PATENT DOCUMENTS

| | | |
|---|---|---|
| 7,086,586 B1 | 8/2006 | Sullivan |
| 7,287,695 B2 | 10/2007 | Wankmueller |
| 7,395,243 B1 | 7/2008 | Zielke et al. |
| 7,398,919 B2 | 7/2008 | Cooper |
| 7,400,883 B2 | 7/2008 | Rivers et al. |
| 7,631,803 B2 | 12/2009 | Peyret et al. |
| 7,757,944 B2 | 7/2010 | Cline et al. |
| 7,774,274 B2 | 8/2010 | Jones et al. |
| 7,822,206 B2 | 10/2010 | Birk et al. |
| 7,827,057 B1 | 11/2010 | Walker et al. |
| 7,860,790 B2 | 12/2010 | Monk |
| 7,909,243 B2 | 3/2011 | Merkow et al. |
| 7,925,285 B2 | 4/2011 | Indirabhai |
| 7,930,225 B2 | 4/2011 | Wahlberg et al. |
| 7,945,776 B1 | 5/2011 | Atzmony et al. |
| 7,958,049 B2 | 6/2011 | Jamison et al. |
| 7,970,669 B1 | 6/2011 | Santos |
| 8,019,365 B2 | 9/2011 | Fisher |
| 8,078,140 B2 | 12/2011 | Baker et al. |
| 8,126,806 B1 | 2/2012 | DiMartino et al. |
| 8,160,959 B2 | 4/2012 | Rackley et al. |
| 8,215,560 B2 | 7/2012 | Granucci et al. |
| 8,280,788 B2 | 10/2012 | Perlman |
| 8,401,904 B1 | 3/2013 | Simakov et al. |
| 8,433,657 B2 | 4/2013 | Dinan |
| 8,452,257 B2 | 5/2013 | Granucci et al. |
| 8,467,766 B2 | 6/2013 | Rackley et al. |
| 8,468,587 B2 | 6/2013 | Blinn et al. |
| 8,489,067 B2 | 7/2013 | Rackley, III et al. |
| 8,504,699 B2 | 8/2013 | Vaughan et al. |
| 8,533,123 B2 | 9/2013 | Hart |
| 8,538,845 B2 | 9/2013 | Liberty |
| 8,548,908 B2 | 10/2013 | Friedman |
| 8,555,361 B2 | 10/2013 | Nakhjiri et al. |
| 8,566,237 B2 | 10/2013 | Forzley |
| 8,566,239 B2 | 10/2013 | Arthur et al. |
| 8,571,953 B2 | 10/2013 | Gopalakrishnan et al. |
| 8,589,290 B2 | 11/2013 | Baskerville |
| 8,615,468 B2 | 12/2013 | Varadarajan |
| 8,626,632 B1 | 1/2014 | Dolan et al. |
| 8,627,424 B1 | 1/2014 | O'Malley et al. |
| 8,635,131 B1 | 1/2014 | Saunders |
| 8,639,621 B1 | 1/2014 | Ellis et al. |
| 8,645,971 B2 | 2/2014 | Carlson et al. |
| 8,676,704 B2 | 3/2014 | Ledbetter et al. |
| 8,682,802 B1 | 3/2014 | Kannanari |
| 8,700,729 B2 | 4/2014 | Dua |
| 8,706,628 B2 | 4/2014 | Phillips |
| 8,725,576 B2 | 5/2014 | Fisher |
| 8,725,577 B2 | 5/2014 | Fisher |
| 8,732,080 B2 | 5/2014 | Karim |
| 8,744,966 B1 | 6/2014 | Amacker et al. |
| 8,750,901 B1 | 6/2014 | Gupta et al. |
| 8,762,265 B2 | 6/2014 | Kessler et al. |
| 8,762,270 B1 | 6/2014 | Evans et al. |
| 8,768,830 B1 | 7/2014 | Jorgensen et al. |
| 8,768,834 B2 | 7/2014 | Zacarias et al. |
| 8,774,781 B1 | 7/2014 | Speiser et al. |
| 8,781,955 B2 | 7/2014 | Schamer et al. |
| 8,831,677 B2 | 9/2014 | Villa-Real |
| 8,838,501 B1 | 9/2014 | Priebatsch |
| 8,843,125 B2 | 9/2014 | Kwon et al. |
| 8,843,417 B2 | 9/2014 | Hammad |
| 8,880,432 B2 | 11/2014 | Collins, Jr. |
| 8,924,246 B1 | 12/2014 | Chen et al. |
| 8,925,805 B2 | 1/2015 | Grigg et al. |
| 8,930,271 B1 | 1/2015 | Ellis et al. |
| 8,972,297 B2 | 3/2015 | Kay et al. |
| 8,977,251 B2 | 3/2015 | Grigg et al. |
| 8,989,712 B2 | 3/2015 | Wentker et al. |
| 9,020,836 B2 | 4/2015 | Fisher et al. |
| 9,026,460 B2 | 5/2015 | Grigg et al. |
| 9,027,109 B2 | 5/2015 | Wolberg-Stok et al. |
| 9,031,880 B2 | 5/2015 | Bishop et al. |
| 9,037,509 B1 | 5/2015 | Ellis et al. |
| 9,043,240 B2 | 5/2015 | Langus et al. |
| 9,043,605 B1 | 5/2015 | Machani |
| 9,098,190 B2 | 8/2015 | Zhou et al. |
| 9,111,266 B2 | 8/2015 | Kessler et al. |
| 9,117,242 B1 | 8/2015 | Ellis et al. |
| 9,177,307 B2 | 11/2015 | Ross et al. |
| 9,208,488 B2 | 12/2015 | Liberty |
| 9,208,528 B2 | 12/2015 | Chelst et al. |
| 9,218,624 B2 | 12/2015 | Moghadam |
| 9,256,876 B2 | 2/2016 | Vasant Akole et al. |
| 9,286,606 B2 | 3/2016 | Diamond |
| 9,324,068 B2 | 4/2016 | Soundararajan |
| 9,361,616 B2 | 6/2016 | Zhou et al. |
| 9,424,572 B2 | 8/2016 | Bondesen et al. |
| 9,473,491 B1 | 10/2016 | Johansson et al. |
| 9,652,770 B1 | 5/2017 | Kurani et al. |
| 9,659,312 B1 | 5/2017 | Ellis et al. |
| 9,691,058 B2 | 6/2017 | Epler et al. |
| 9,704,157 B1 | 7/2017 | Ellis et al. |
| 9,741,051 B2 | 8/2017 | Carpenter et al. |
| 9,785,934 B2 | 10/2017 | Davis et al. |
| 9,805,363 B1 | 10/2017 | Rudnick et al. |
| 9,818,109 B2 | 11/2017 | Loh |
| 9,928,518 B1 | 3/2018 | Vippagunta et al. |
| 9,972,047 B1 | 5/2018 | Elliott et al. |
| 10,019,740 B2 | 7/2018 | Simantov et al. |
| 10,037,561 B1 | 7/2018 | Hecht et al. |
| 10,115,112 B2 | 10/2018 | Fordyce, III |
| 10,121,129 B2 | 11/2018 | Kalgi |
| 10,223,710 B2 | 3/2019 | Purves et al. |
| 10,235,668 B1 | 3/2019 | Ellis et al. |
| 10,242,368 B1 | 3/2019 | Poole |
| 10,380,583 B1 | 8/2019 | Ellis et al. |
| 10,380,596 B1 | 8/2019 | Butler et al. |
| 10,395,247 B2 | 8/2019 | Gilliam et al. |
| 10,402,897 B1 | 9/2019 | Czyzewski et al. |
| 10,445,739 B1 | 10/2019 | Sahni et al. |
| 10,467,615 B1 | 11/2019 | Omojola et al. |
| 10,515,356 B2 | 12/2019 | Cronic et al. |
| 10,565,558 B2 | 2/2020 | Fredericks et al. |
| 10,586,236 B2 | 3/2020 | Pourfallah et al. |
| 10,600,128 B2 | 3/2020 | Graham et al. |
| 10,817,950 B1 | 10/2020 | Iqbal et al. |
| 10,853,787 B1 | 12/2020 | Mango |
| 10,887,301 B1 | 1/2021 | Vera et al. |
| 10,997,592 B1 | 5/2021 | Kurani |
| 11,042,882 B2 | 6/2021 | Ledford et al. |
| 11,068,866 B1 | 7/2021 | Hecht et al. |
| 11,144,902 B2 | 10/2021 | Gaddam et al. |
| 11,151,546 B2 | 10/2021 | Mossoba et al. |
| 11,210,715 B2 | 12/2021 | Lindsey et al. |
| 11,228,660 B2 | 1/2022 | Rapaka et al. |
| 11,270,293 B2 | 3/2022 | Salama et al. |
| 11,288,660 B1 | 3/2022 | Kurani |
| 11,295,294 B1 | 4/2022 | Kurani et al. |
| 11,334,579 B1 | 5/2022 | Quade et al. |
| 11,416,766 B2 | 8/2022 | Chao et al. |
| 11,422,393 B2 | 8/2022 | Stray et al. |
| 11,436,581 B1 | 9/2022 | Walker et al. |
| 11,551,190 B1 | 1/2023 | Clements et al. |
| 2002/0032602 A1 | 3/2002 | Lanzillo et al. |
| 2002/0052852 A1 | 5/2002 | Bozeman |
| 2002/0062249 A1 | 5/2002 | Iannacci |
| 2002/0174016 A1 | 11/2002 | Cuervo |
| 2002/0198829 A1 | 12/2002 | Ludwig et al. |
| 2003/0028481 A1 | 2/2003 | Flitcroft et al. |
| 2003/0040964 A1 | 2/2003 | Lacek |
| 2003/0055785 A1 | 3/2003 | Lahiri |
| 2003/0056096 A1 | 3/2003 | Albert et al. |
| 2003/0172039 A1 | 9/2003 | Guy et al. |
| 2004/0088349 A1 | 5/2004 | Beck et al. |
| 2004/0230535 A1 | 11/2004 | Binder et al. |
| 2004/0236632 A1 | 11/2004 | Maritzen et al. |
| 2004/0254848 A1 | 12/2004 | Golan et al. |
| 2004/0260646 A1 | 12/2004 | Berardi et al. |
| 2005/0021401 A1 | 1/2005 | Postrel |
| 2005/0021457 A1 | 1/2005 | Johnson et al. |
| 2005/0043997 A1 | 2/2005 | Sahota et al. |
| 2005/0077350 A1 | 4/2005 | Courtion et al. |

(56) References Cited

U.S. PATENT DOCUMENTS

| | | |
|---|---|---|
| 2005/0086492 A1 | 4/2005 | Nicodemus et al. |
| 2005/0125317 A1 | 6/2005 | Winkelman et al. |
| 2005/0125668 A1 | 6/2005 | Botz |
| 2005/0133590 A1 | 6/2005 | Rettenmyer et al. |
| 2005/0138377 A1 | 6/2005 | First et al. |
| 2005/0184145 A1 | 8/2005 | Law et al. |
| 2005/0235363 A1 | 10/2005 | Hibbard et al. |
| 2006/0129502 A1 | 6/2006 | Pastusiak et al. |
| 2006/0229985 A1 | 10/2006 | Lalwani et al. |
| 2006/0253335 A1 | 11/2006 | Keena et al. |
| 2007/0125840 A1 | 6/2007 | Law |
| 2007/0162369 A1 | 7/2007 | Hardison |
| 2007/0168354 A1 | 7/2007 | Ramer et al. |
| 2007/0170243 A1 | 7/2007 | Desany et al. |
| 2007/0174166 A1 | 7/2007 | Jones |
| 2007/0174873 A1 | 7/2007 | Griggs |
| 2007/0198432 A1 | 8/2007 | Pitroda |
| 2007/0244811 A1 | 10/2007 | Tumminaro |
| 2007/0250923 A1 | 10/2007 | M'Raihi |
| 2007/0262140 A1 | 11/2007 | Long |
| 2008/0006685 A1 | 1/2008 | Rackley, III et al. |
| 2008/0033878 A1 | 2/2008 | Krikorian et al. |
| 2008/0127317 A1 | 5/2008 | Nakhjiri |
| 2008/0203152 A1 | 8/2008 | Hammad et al. |
| 2008/0208742 A1 | 8/2008 | Arthur et al. |
| 2008/0242274 A1 | 10/2008 | Swanburg et al. |
| 2008/0294556 A1 | 11/2008 | Anderson |
| 2008/0319887 A1 | 12/2008 | Pizzi et al. |
| 2009/0027191 A1 | 1/2009 | Farah et al. |
| 2009/0043695 A1 | 2/2009 | Hickey |
| 2009/0048971 A1 | 2/2009 | Hathaway et al. |
| 2009/0063178 A1 | 3/2009 | Pousti et al. |
| 2009/0076950 A1 | 3/2009 | Chang et al. |
| 2009/0106558 A1 | 4/2009 | Delgrosso et al. |
| 2009/0157531 A1 | 6/2009 | Bui |
| 2009/0177563 A1 | 7/2009 | Bernstein et al. |
| 2009/0192873 A1 | 7/2009 | Marble |
| 2009/0271287 A1 | 10/2009 | Halpern |
| 2009/0281941 A1 | 11/2009 | Worth |
| 2009/0281951 A1 | 11/2009 | Shakkarwar |
| 2009/0319409 A1 | 12/2009 | Omidyar |
| 2009/0319427 A1 | 12/2009 | Gardner et al. |
| 2009/0327010 A1 | 12/2009 | Vadhri |
| 2009/0327151 A1 | 12/2009 | Carlson et al. |
| 2010/0057553 A1 | 3/2010 | Ameiss et al. |
| 2010/0063906 A1 | 3/2010 | Nelsen et al. |
| 2010/0076833 A1 | 3/2010 | Nelsen |
| 2010/0088188 A1 | 4/2010 | Kumar et al. |
| 2010/0114724 A1 | 5/2010 | Ghosh et al. |
| 2010/0114731 A1 | 5/2010 | Kingston et al. |
| 2010/0114733 A1 | 5/2010 | Collas et al. |
| 2010/0125495 A1 | 5/2010 | Smith et al. |
| 2010/0125510 A1 | 5/2010 | Smith et al. |
| 2010/0131415 A1 | 5/2010 | Sartipi |
| 2010/0191602 A1 | 7/2010 | Mikkelsen et al. |
| 2010/0205077 A1 | 8/2010 | Hammad |
| 2010/0274655 A1 | 10/2010 | Postrel |
| 2010/0280896 A1 | 11/2010 | Postrel |
| 2010/0325048 A1 | 12/2010 | Carlson et al. |
| 2010/0332386 A1 | 12/2010 | Vancini et al. |
| 2011/0055080 A1 | 3/2011 | Ahlers et al. |
| 2011/0071914 A1 | 3/2011 | Beasley et al. |
| 2011/0106601 A1 | 5/2011 | Perlman et al. |
| 2011/0106674 A1 | 5/2011 | Perlman |
| 2011/0137797 A1 | 6/2011 | Stals et al. |
| 2011/0153397 A1 | 6/2011 | Wagenheim |
| 2011/0191160 A1 | 8/2011 | Blackhurst et al. |
| 2011/0196782 A1 | 8/2011 | Allen et al. |
| 2011/0251892 A1 | 10/2011 | Laracey |
| 2011/0270665 A1 | 11/2011 | Kim et al. |
| 2011/0270748 A1 | 11/2011 | Graham et al. |
| 2011/0270749 A1 | 11/2011 | Bennett et al. |
| 2011/0276489 A1 | 11/2011 | Larkin |
| 2011/0289004 A1 | 11/2011 | Prakash et al. |
| 2011/0295748 A1 | 12/2011 | Woodriffe |
| 2011/0295749 A1 | 12/2011 | Scalisi |
| 2011/0313918 A1 | 12/2011 | Lawson et al. |
| 2012/0011063 A1 | 1/2012 | Killian et al. |
| 2012/0018511 A1 | 1/2012 | Hammad |
| 2012/0078735 A1 | 3/2012 | Bauer et al. |
| 2012/0078751 A1 | 3/2012 | MacPhail et al. |
| 2012/0084210 A1 | 4/2012 | Farahmand |
| 2012/0110634 A1 | 5/2012 | Jakobsson |
| 2012/0130731 A1 | 5/2012 | Canetto |
| 2012/0130887 A1 | 5/2012 | Meckling |
| 2012/0143705 A1 | 6/2012 | Bhattacharya et al. |
| 2012/0150687 A1 | 6/2012 | Hart |
| 2012/0158589 A1 | 6/2012 | Katzin et al. |
| 2012/0185317 A1 | 7/2012 | Wong |
| 2012/0185387 A1 | 7/2012 | Doyle |
| 2012/0196586 A1 | 8/2012 | Grigg et al. |
| 2012/0197793 A1 | 8/2012 | Grigg et al. |
| 2012/0197794 A1 | 8/2012 | Grigg et al. |
| 2012/0209749 A1 | 8/2012 | Hammad et al. |
| 2012/0233005 A1 | 9/2012 | White |
| 2012/0239417 A1 | 9/2012 | Pourfallah et al. |
| 2012/0253852 A1 | 10/2012 | Pourfallah et al. |
| 2012/0253913 A1 | 10/2012 | Richard |
| 2012/0254021 A1 | 10/2012 | Wohied et al. |
| 2012/0271712 A1 | 10/2012 | Katzin et al. |
| 2012/0284130 A1 | 11/2012 | Lewis et al. |
| 2012/0284195 A1 | 11/2012 | McMillen et al. |
| 2012/0290376 A1 | 11/2012 | Dryer et al. |
| 2012/0296720 A1 | 11/2012 | Pirillo |
| 2012/0301774 A1 | 11/2012 | Jiang et al. |
| 2012/0303425 A1 | 11/2012 | Katzin et al. |
| 2012/0310774 A1 | 12/2012 | Chassin |
| 2012/0323717 A1 | 12/2012 | Kirsch |
| 2012/0323762 A1 | 12/2012 | Kapur et al. |
| 2012/0330837 A1 | 12/2012 | Persaud et al. |
| 2013/0006848 A1 | 1/2013 | Kuttuva |
| 2013/0013509 A1 | 1/2013 | Perlman et al. |
| 2013/0018777 A1 | 1/2013 | Klein |
| 2013/0018786 A1 | 1/2013 | Sher |
| 2013/0018791 A1 | 1/2013 | Mendicino et al. |
| 2013/0018792 A1 | 1/2013 | Casey et al. |
| 2013/0024364 A1 | 1/2013 | Shrivastava et al. |
| 2013/0030941 A1 | 1/2013 | Meredith et al. |
| 2013/0042261 A1 | 2/2013 | Tavormina et al. |
| 2013/0054336 A1 | 2/2013 | Graylin |
| 2013/0054454 A1 | 2/2013 | Purves et al. |
| 2013/0054469 A1 | 2/2013 | Agashe et al. |
| 2013/0060679 A1 | 3/2013 | Oskolkov et al. |
| 2013/0060689 A1 | 3/2013 | Oskolkov et al. |
| 2013/0060696 A1 | 3/2013 | Martin et al. |
| 2013/0060708 A1 | 3/2013 | Oskolkov et al. |
| 2013/0065555 A1 | 3/2013 | Baker et al. |
| 2013/0073365 A1 | 3/2013 | McCarthy |
| 2013/0073459 A1 | 3/2013 | Zacarias et al. |
| 2013/0074168 A1 | 3/2013 | Hao et al. |
| 2013/0080241 A1 | 3/2013 | Fisher |
| 2013/0080323 A1 | 3/2013 | Scipioni |
| 2013/0110628 A1 | 5/2013 | Yeo et al. |
| 2013/0110658 A1 | 5/2013 | Lyman et al. |
| 2013/0132275 A1 | 5/2013 | Enzaldo et al. |
| 2013/0132854 A1 | 5/2013 | Raleigh et al. |
| 2013/0143089 A1 | 6/2013 | Teshima et al. |
| 2013/0144663 A1 | 6/2013 | Qawami et al. |
| 2013/0144702 A1 | 6/2013 | Tabor et al. |
| 2013/0151400 A1 | 6/2013 | Makhotin et al. |
| 2013/0166332 A1 | 6/2013 | Hammad |
| 2013/0168450 A1 | 7/2013 | Von Mueller et al. |
| 2013/0173456 A1 | 7/2013 | Grigg et al. |
| 2013/0173474 A1 | 7/2013 | Ranganathan et al. |
| 2013/0179336 A1 | 7/2013 | Lyons et al. |
| 2013/0179352 A1 | 7/2013 | Dwyre et al. |
| 2013/0185167 A1 | 7/2013 | Mestre et al. |
| 2013/0191227 A1 | 7/2013 | Pasa et al. |
| 2013/0191277 A1 | 7/2013 | O'Leary et al. |
| 2013/0191278 A1 | 7/2013 | O'Leary et al. |
| 2013/0200999 A1 | 8/2013 | Spodak et al. |
| 2013/0204785 A1 | 8/2013 | Monk et al. |
| 2013/0226720 A1 | 8/2013 | Ahluwalia et al. |
| 2013/0226751 A1 | 8/2013 | Friedholm et al. |

(56) References Cited

U.S. PATENT DOCUMENTS

| | | |
|---|---|---|
| 2013/0226799 A1 | 8/2013 | Raj |
| 2013/0232032 A1 | 9/2013 | Chaturvedi et al. |
| 2013/0238455 A1 | 9/2013 | Laracey |
| 2013/0246258 A1 | 9/2013 | Dessert |
| 2013/0246260 A1 | 9/2013 | Barten et al. |
| 2013/0246261 A1 | 9/2013 | Purves et al. |
| 2013/0246265 A1 | 9/2013 | Al-Sahli |
| 2013/0254028 A1 | 9/2013 | Salci |
| 2013/0254102 A1 | 9/2013 | Royyuru |
| 2013/0254114 A1 | 9/2013 | Smith |
| 2013/0254115 A1 | 9/2013 | Pasa et al. |
| 2013/0260734 A1 | 10/2013 | Jain et al. |
| 2013/0262309 A1 | 10/2013 | Gadotti |
| 2013/0262316 A1 | 10/2013 | Hruska |
| 2013/0262317 A1 | 10/2013 | Collinge et al. |
| 2013/0275250 A1 | 10/2013 | Rodell et al. |
| 2013/0290121 A1 | 10/2013 | Simakov et al. |
| 2013/0290169 A1 | 10/2013 | Bathula et al. |
| 2013/0290176 A1 | 10/2013 | Tirumalashetty |
| 2013/0297425 A1 | 11/2013 | Wallaja |
| 2013/0297486 A1 | 11/2013 | Colborn |
| 2013/0297513 A1 | 11/2013 | Kirillin et al. |
| 2013/0304559 A1 | 11/2013 | Stone et al. |
| 2013/0304642 A1 | 11/2013 | Campos |
| 2013/0317928 A1 | 11/2013 | Laracey |
| 2013/0332344 A1 | 12/2013 | Weber |
| 2013/0346302 A1 | 12/2013 | Purves et al. |
| 2014/0006129 A1 | 1/2014 | Heath |
| 2014/0006194 A1 | 1/2014 | Xie et al. |
| 2014/0006276 A1 | 1/2014 | Grigg et al. |
| 2014/0006277 A1 | 1/2014 | Rao |
| 2014/0012750 A1 | 1/2014 | Kuhn et al. |
| 2014/0019352 A1 | 1/2014 | Shrivastava |
| 2014/0019360 A1 | 1/2014 | Yang |
| 2014/0038546 A1 | 2/2014 | Neal et al. |
| 2014/0040139 A1 | 2/2014 | Brudnicki et al. |
| 2014/0052617 A1 | 2/2014 | Chawla et al. |
| 2014/0058855 A1 | 2/2014 | Hussein et al. |
| 2014/0058936 A1 | 2/2014 | Ren et al. |
| 2014/0058938 A1 | 2/2014 | McClung, III |
| 2014/0067677 A1 | 3/2014 | Ali et al. |
| 2014/0074581 A1 | 3/2014 | Johnson et al. |
| 2014/0074655 A1 | 3/2014 | Lim et al. |
| 2014/0074724 A1 | 3/2014 | Gordon et al. |
| 2014/0081783 A1 | 3/2014 | Paranjape et al. |
| 2014/0081854 A1 | 3/2014 | Sanchez et al. |
| 2014/0089171 A1 | 3/2014 | Gandhi |
| 2014/0089195 A1 | 3/2014 | Ward et al. |
| 2014/0096215 A1 | 4/2014 | Hessler |
| 2014/0100975 A1 | 4/2014 | Van |
| 2014/0101034 A1 | 4/2014 | Tanner et al. |
| 2014/0101048 A1 | 4/2014 | Gardiner et al. |
| 2014/0108254 A1 | 4/2014 | Lee |
| 2014/0109200 A1 | 4/2014 | Tootill et al. |
| 2014/0114856 A1 | 4/2014 | Jung et al. |
| 2014/0118704 A1 | 5/2014 | Duelli et al. |
| 2014/0122310 A1 | 5/2014 | Torrens et al. |
| 2014/0122563 A1 | 5/2014 | Singh et al. |
| 2014/0129357 A1 | 5/2014 | Goodwin |
| 2014/0129433 A1 | 5/2014 | Rosenberger |
| 2014/0136352 A1 | 5/2014 | Ramakrishna et al. |
| 2014/0143089 A1 | 5/2014 | Campos et al. |
| 2014/0188586 A1 | 7/2014 | Carpenter et al. |
| 2014/0188704 A1 | 7/2014 | Grossman et al. |
| 2014/0188718 A1 | 7/2014 | Grossman et al. |
| 2014/0188719 A1 | 7/2014 | Poornachandran et al. |
| 2014/0201086 A1 | 7/2014 | Gadotti et al. |
| 2014/0207680 A1 | 7/2014 | Rephlo |
| 2014/0210321 A1 | 7/2014 | Dixon |
| 2014/0214640 A1 | 7/2014 | Mallikarjunan et al. |
| 2014/0222670 A1 | 8/2014 | Concannon |
| 2014/0236792 A1 | 8/2014 | Pant et al. |
| 2014/0244506 A1 | 8/2014 | Gramling |
| 2014/0250003 A1 | 9/2014 | Levchin et al. |
| 2014/0258135 A1 | 9/2014 | Park et al. |
| 2014/0279097 A1 | 9/2014 | Alshobaki et al. |
| 2014/0279459 A1 | 9/2014 | Weiss et al. |
| 2014/0279469 A1 | 9/2014 | Mendes |
| 2014/0279559 A1 | 9/2014 | Smith et al. |
| 2014/0279566 A1 | 9/2014 | Verma et al. |
| 2014/0282068 A1 | 9/2014 | Levkovitz et al. |
| 2014/0297435 A1 | 10/2014 | Wong |
| 2014/0297520 A1 | 10/2014 | Levchin et al. |
| 2014/0297524 A1 | 10/2014 | Ravindranath et al. |
| 2014/0304095 A1 | 10/2014 | Fisher |
| 2014/0304187 A1 | 10/2014 | Menn |
| 2014/0310173 A1 | 10/2014 | Caldwell |
| 2014/0310182 A1 | 10/2014 | Cummins |
| 2014/0337175 A1 | 11/2014 | Katzin et al. |
| 2014/0337621 A1 | 11/2014 | Nakhimov |
| 2014/0344153 A1 | 11/2014 | Raj et al. |
| 2014/0351072 A1 | 11/2014 | Wieler et al. |
| 2014/0351126 A1 | 11/2014 | Priebatsch |
| 2014/0351130 A1 | 11/2014 | Cheek et al. |
| 2014/0365322 A1 | 12/2014 | Phillips |
| 2014/0365363 A1 | 12/2014 | Knudsen et al. |
| 2014/0376576 A1 | 12/2014 | Jespersen et al. |
| 2014/0379576 A1 | 12/2014 | Marx et al. |
| 2015/0019944 A1 | 1/2015 | Kalgi |
| 2015/0026049 A1 | 1/2015 | Theurer et al. |
| 2015/0032626 A1 | 1/2015 | Dill et al. |
| 2015/0032627 A1 | 1/2015 | Dill et al. |
| 2015/0046339 A1 | 2/2015 | Wong et al. |
| 2015/0066790 A1 | 3/2015 | Desanti |
| 2015/0074774 A1 | 3/2015 | Nema et al. |
| 2015/0088633 A1 | 3/2015 | Salmon et al. |
| 2015/0089568 A1 | 3/2015 | Sprague et al. |
| 2015/0095075 A1 | 4/2015 | Breuer et al. |
| 2015/0100442 A1 | 4/2015 | Van Heerden et al. |
| 2015/0100495 A1 | 4/2015 | Salama et al. |
| 2015/0112781 A1 | 4/2015 | Clark et al. |
| 2015/0120472 A1 | 4/2015 | Aabye et al. |
| 2015/0121063 A1 | 4/2015 | Maller et al. |
| 2015/0134514 A1 | 5/2015 | Chan et al. |
| 2015/0134540 A1 | 5/2015 | Law et al. |
| 2015/0137938 A1 | 5/2015 | Slaby et al. |
| 2015/0140960 A1 | 5/2015 | Powell et al. |
| 2015/0154588 A1 | 6/2015 | Purves et al. |
| 2015/0178693 A1 | 6/2015 | Solis |
| 2015/0186855 A1 | 7/2015 | Bennett et al. |
| 2015/0186872 A1 | 7/2015 | Sobol et al. |
| 2015/0186875 A1 | 7/2015 | Zhang et al. |
| 2015/0186886 A1 | 7/2015 | Schwalb et al. |
| 2015/0186952 A1 | 7/2015 | Brown et al. |
| 2015/0187021 A1 | 7/2015 | Moring et al. |
| 2015/0193131 A1 | 7/2015 | Bayer et al. |
| 2015/0193745 A1 | 7/2015 | Handwerger et al. |
| 2015/0193869 A1 | 7/2015 | Del Vecchio et al. |
| 2015/0213435 A1 | 7/2015 | Douglas et al. |
| 2015/0220914 A1 | 8/2015 | Purves et al. |
| 2015/0229622 A1 | 8/2015 | Grigg et al. |
| 2015/0237026 A1 | 8/2015 | Kumar |
| 2015/0242987 A1 | 8/2015 | Lee et al. |
| 2015/0254660 A1 | 9/2015 | Allison et al. |
| 2015/0254698 A1 | 9/2015 | Bondesen et al. |
| 2015/0254699 A1 | 9/2015 | Bondesen et al. |
| 2015/0278799 A1 | 10/2015 | Palanisamy |
| 2015/0278816 A1 | 10/2015 | Fleishman et al. |
| 2015/0287015 A1 | 10/2015 | Kaplinger et al. |
| 2015/0287037 A1 | 10/2015 | Salmon et al. |
| 2015/0324768 A1 | 11/2015 | Filter et al. |
| 2015/0332252 A1 | 11/2015 | Shahrokhi et al. |
| 2015/0333964 A1 | 11/2015 | Wang et al. |
| 2015/0339662 A1 | 11/2015 | Huang et al. |
| 2015/0339663 A1 | 11/2015 | Lopreiato et al. |
| 2015/0339671 A1 | 11/2015 | Krietzman et al. |
| 2015/0348029 A1 | 12/2015 | Van Os et al. |
| 2015/0363810 A1 | 12/2015 | Kim et al. |
| 2015/0371212 A1 | 12/2015 | Giordano et al. |
| 2015/0371234 A1 | 12/2015 | Huang et al. |
| 2015/0371326 A1 | 12/2015 | Montesano et al. |
| 2016/0004876 A1 | 1/2016 | Bye et al. |
| 2016/0012465 A1 | 1/2016 | Sharp |
| 2016/0026999 A1 | 1/2016 | Kurian |

(56) References Cited

U.S. PATENT DOCUMENTS

| | | |
|---|---|---|
| 2016/0042341 A1 | 2/2016 | Griffin et al. |
| 2016/0042344 A1 | 2/2016 | Thimmana et al. |
| 2016/0048828 A1 | 2/2016 | Lee |
| 2016/0048929 A1 | 2/2016 | Parento et al. |
| 2016/0054336 A1 | 2/2016 | Anderberg et al. |
| 2016/0063496 A1 | 3/2016 | Royyuru et al. |
| 2016/0065370 A1 | 3/2016 | Le Saint et al. |
| 2016/0071071 A1 | 3/2016 | Lazay |
| 2016/0071074 A1 | 3/2016 | Baird |
| 2016/0071096 A1 | 3/2016 | Rosca |
| 2016/0071097 A1 | 3/2016 | Lazay |
| 2016/0071099 A1 | 3/2016 | Lazay |
| 2016/0071109 A1 | 3/2016 | Lazay |
| 2016/0071110 A1 | 3/2016 | Lazay |
| 2016/0086170 A1 | 3/2016 | Hurt et al. |
| 2016/0086179 A1 | 3/2016 | Barbier |
| 2016/0092696 A1 | 3/2016 | Guglani et al. |
| 2016/0092866 A1 | 3/2016 | Liberty et al. |
| 2016/0092868 A1 | 3/2016 | Salama et al. |
| 2016/0092874 A1 | 3/2016 | O'Regan et al. |
| 2016/0125396 A1 | 5/2016 | Brickell et al. |
| 2016/0125409 A1 | 5/2016 | Meredith et al. |
| 2016/0125417 A1 | 5/2016 | Huang et al. |
| 2016/0132875 A1 | 5/2016 | Blanco et al. |
| 2016/0132884 A1 | 5/2016 | Fridman et al. |
| 2016/0140555 A1 | 5/2016 | Scipioni |
| 2016/0140561 A1 | 5/2016 | Cowan |
| 2016/0162882 A1 | 6/2016 | McClung, III |
| 2016/0162889 A1 | 6/2016 | Badenhorst |
| 2016/0180305 A1 | 6/2016 | Dresser et al. |
| 2016/0269416 A1 | 9/2016 | Camenisch et al. |
| 2016/0283925 A1 | 9/2016 | Lavu et al. |
| 2016/0342962 A1 | 11/2016 | Brown et al. |
| 2016/0342992 A1 | 11/2016 | Lee |
| 2016/0343043 A1 | 11/2016 | Hicks et al. |
| 2016/0379215 A1 | 12/2016 | Clerkin |
| 2017/0017958 A1 | 1/2017 | Scott et al. |
| 2017/0061402 A1 | 3/2017 | Mobin et al. |
| 2017/0061406 A1 | 3/2017 | Adams et al. |
| 2017/0061438 A1 | 3/2017 | Patel |
| 2017/0164139 A1 | 6/2017 | Deselaers et al. |
| 2017/0178110 A1 | 6/2017 | Swanson et al. |
| 2017/0185989 A1 | 6/2017 | Bozovich, Jr. |
| 2017/0193468 A1 | 7/2017 | Chougule et al. |
| 2017/0228715 A1 | 8/2017 | Gurunathan |
| 2017/0236118 A1 | 8/2017 | Laracey |
| 2017/0337542 A1 | 11/2017 | Kim et al. |
| 2017/0357969 A1 | 12/2017 | Huang et al. |
| 2017/0357977 A1 | 12/2017 | Pitz et al. |
| 2017/0364914 A1 | 12/2017 | Howard |
| 2018/0007052 A1 | 1/2018 | Quentin |
| 2018/0012203 A1 | 1/2018 | Hall |
| 2018/0032981 A1 | 2/2018 | Shanmugam et al. |
| 2018/0068308 A1 | 3/2018 | Gupta et al. |
| 2018/0082283 A1 | 3/2018 | Sharma |
| 2018/0096428 A1 | 4/2018 | Gorenstein |
| 2018/0157336 A1 | 6/2018 | Harris et al. |
| 2018/0219863 A1 | 8/2018 | Tran |
| 2018/0285836 A1 | 10/2018 | Enobakhare |
| 2018/0322488 A1 | 11/2018 | Arana et al. |
| 2018/0324204 A1 | 11/2018 | McClory et al. |
| 2018/0365675 A1 | 12/2018 | Sivaraman |
| 2018/0374076 A1 | 12/2018 | Wheeler |
| 2019/0108505 A1 | 4/2019 | Perlman |
| 2019/0122222 A1 | 4/2019 | Uechi |
| 2019/0165942 A1 | 5/2019 | Subramaniam |
| 2019/0220908 A1 | 7/2019 | Wilkes |
| 2019/0236577 A1 | 8/2019 | Schmid et al. |
| 2019/0280863 A1 | 9/2019 | Meyer et al. |
| 2019/0303803 A1 | 10/2019 | Buc et al. |
| 2019/0304029 A1 | 10/2019 | Murray et al. |
| 2019/0385250 A1 | 12/2019 | Bhattacharjee et al. |
| 2020/0005277 A1 | 1/2020 | Prabhu et al. |
| 2020/0028753 A1 | 1/2020 | Powar et al. |
| 2020/0034813 A1 | 1/2020 | Calinog et al. |
| 2020/0051117 A1 | 2/2020 | Mitchell |
| 2020/0097957 A1 | 3/2020 | Driggs et al. |
| 2020/0151706 A1 | 5/2020 | Mossoba et al. |
| 2020/0175496 A1 | 6/2020 | Finke et al. |
| 2020/0219060 A1 | 7/2020 | Fredericks et al. |
| 2020/0279305 A1 | 9/2020 | Mossoba et al. |
| 2020/0372536 A1 | 11/2020 | Scislowski et al. |
| 2021/0027291 A1* | 1/2021 | Ranganathan ........ H04L 63/102 |
| 2021/0056552 A1 | 2/2021 | Murray |
| 2021/0110392 A1 | 4/2021 | Lacoss-Arnold et al. |
| 2021/0158333 A1 | 5/2021 | Cohen et al. |
| 2021/0166260 A1 | 6/2021 | Ho et al. |
| 2021/0358754 A1 | 11/2021 | Masuoka et al. |
| 2021/0398179 A1 | 12/2021 | Kolaja et al. |
| 2022/0027873 A1 | 1/2022 | Pathuri et al. |
| 2022/0101609 A1 | 3/2022 | Hu et al. |
| 2022/0147967 A1 | 5/2022 | Clark |
| 2022/0210209 A1 | 6/2022 | Vanbuskirk et al. |
| 2022/0215356 A1* | 7/2022 | Dakshinyam .......... G06Q 20/40 |

FOREIGN PATENT DOCUMENTS

| | | |
|---|---|---|
| WO | WO-2011/100529 A1 | 8/2011 |
| WO | WO-2011/113121 A1 | 9/2011 |
| WO | WO-2011/159842 A2 | 12/2011 |
| WO | WO-2012/139003 A2 | 10/2012 |
| WO | WO-2013/044175 A1 | 3/2013 |
| WO | WO-2013/079793 A1 | 6/2013 |
| WO | WO-2014/111888 A1 | 7/2014 |
| WO | WO-2014/134180 A2 | 9/2014 |
| WO | WO-2014/207615 A1 | 12/2014 |
| WO | WO-2014/210321 A2 | 12/2014 |
| WO | WO-2015/023172 A2 | 2/2015 |
| WO | WO-2015/054697 A1 | 4/2015 |
| WO | WO-2016/009198 A1 | 1/2016 |
| WO | WO-2016/053975 A1 | 4/2016 |
| WO | WO-2016/097879 A1 | 6/2016 |
| WO | WO-2016/153977 A1 | 9/2016 |
| WO | WO-2016/172107 A1 | 10/2016 |
| WO | WO-2016/196054 A1 | 12/2016 |
| WO | WO-2017/106309 A1 | 6/2017 |
| WO | WO-2018/005798 A1 | 1/2018 |

OTHER PUBLICATIONS

Authors: Saygin Baksi et al; Title: Optimal primary-secondary user pairing and power allocation in cognitive cooperative multiple access channels; Date Added to IEEE Xplore: Apr. 10, 2014 (Year: 2014).

Authors et al: Tianliang Lei ; Title: Investigation of Cross-Social Network User Identification; Date of Conference: Apr. 21-22, 2022 . (Year: 2022).

P2P-Paid: A Peer-to-Peer Wireless Payment System by Gao et al (Year: 2005).

"Wang et al. Mobile payment security, threats, and challenges, Mar. 24, 2016, IEEE Xplore, Entire document" (Year: 2016).

Hany Herb, Hassan Farahat, and Mohamed Ezz, SecureSMSPay: Secure SMS Mobile Payment Model, 2008, 2008 2nd International Conference on Anti-counterfeiting, Security and Identification (pp. 11-17) (Year:2008).

J. Gao, V. Kulkarni, H. Ranavat, L. Chang and H. Mei, "A 2D Barcode-Based Mobile Payment System," 2009 Third International Conference on Multimedia and Ubiquitous Engineering, 2009, pp. 320-329, doi: 10.1109/MU E.2009.62. (Year: 2009).

Latterell, Kayla, "How Do Gift Cards Work?," https://www.cardsource.com/news/how-do-gift-cards-work, pp. 1-6.

"Cashcloud Mobile eWallet", FinTech Forum Exchange, Jul. 1, 2016. 4 pages.

"Cashcloud mobile eWallet", Popote Payments, www.popotepayments.com, 2016. 6 pages.

"Messages in the SCT interbank space—pacs.008 and pacs.002", Nov. 1, 2017, Paiementor, pp. 1-3 (Year: 2017).

A Smart Card Alliance Payments Council White Paper; Publication date: Sep. 2011; Publication No. PC-11002; 191 Clarksville Rd. Princeton Junction, NJ 08550 www.smartcardalliance.org (Year: 2011).

(56) References Cited

OTHER PUBLICATIONS

Alipay, Alipay Documentation Red Packet QR Code Introduction, printed on Sep. 30, 2019 at Internet address https://intl.alipay.com/doc/redpacket/scrzsv, 2 pages.
Alipay, Trust Makes It Simple, printed on Sep. 30, 2019 from Internet address https://intl.alipay.com/, 3 pages.
Authors et al.: Disclosed anonymously, Notifying a User When a Bill is Due Using a Notification on the User's Mobile Device, Oct. 18, 2013 IP.com PAD, entire document (Year: 2013).
Bravo, Bravo Pay, CrunchBase, printed on Sep. 30, 2019 from Internet address https://www.crunchbase.com/organization/bravo#section-overview, 9 pages.
Bravo, Tip or Pay Your Tour Guide Without Sharing Personal Info, printed on Sep. 30, 2019 from Internet address https://trybravo.com, 4 pages.
Bravo, Trybravo's Competitors, Revenue, Number of Employees, Funding and Acquisitions, printed from Internet address https://www.owler.com/company/trybravo on Sep. 30, 2019, 2 pages.
DipJar, printed on Sep. 30, 2019 from Internet address https://www.dipjar.com/, 10 pages.
EMV, "Payment Tokenisation Specification Technical Framework", 2014 EMVCO, LLC. 84 pages.
How to Control Children's Spending on Debit Cards | Money | by Jill Paperworth, May 10, 2009, https:www.theguardian.com/money/2009/mar/.../children-debit-cards-online-spend . . . (Year: 2009).
Lehdonvirta et al., UbiPay: Minimizing Transaction Costs with Smart Mobile Payments, Proceedings of the 6th International Conference on Mobile Technology, Application & Systems, ACM, Jan. 2009, retrieved from the Internet at http://www.researchgate.net/profile/Tatsuo_Nakajima/publication/220982951_UbiPay_minimizing_transaction_costs_with_smart_mobile_payments/links/548e9dad0cf225bf66a607bb.pdf on Oct. 30, 2015, 8 pages.
LevelUp, Restaurant Customers Expect Seamless Digital Experiences, printed on Sep. 30, 2019 from Internet address https://www.thelevelup.com/, 4 pages.
Message in the SCT interbank space—pacs.008 and pacs.002, Nov. 1, 2017, Paiementor, pp. 1-3 (Year: 2017).
N. C. Kiran and G. N. Kumar, "Reliable OSPM schema for secure transaction using mobile agent in micropayment system," 2013 Fourth International Conference on Computing, Communications and Networking Technologies (ICCCNT), 2013, pp. 1-6, doi: 10.1109/ICCCNT.2013,6726503. (Year: 2013).
P. De, K. Dey, V. Mankar and S. Mukherjea, "Towards an interoperable mobile wallet service," 2013 10th International Conference and Expo on Emerging Technologies for a Smarter World (CEWIT), 2013, pp. 1-6, doi: 1109/CEWIT.2013.6713767. (Year: 2013).
Smart Card Alliance, "The Mobile Payments and NFC Landscape: A U.S. Perspective," Sep. 2011. 53 pages.
Square, Inc., Grow Your Business Your Way With Square Tools, printed on Sep. 30, 2019 from Internet address https://squareup.com/us/en, 8 pages.
TSIP, Introducing Helping Heart—A Contactless Payment Jacket to Help the Homeless, dated Jul. 4, 2017, printed on Sep. 30, 2019 from Internet address https://www.tsip.co.uk/blog/2019/2/19/introducing-helping-heart-a-contactless-payment-jacket-to-help-the-homeless, 4 pages.
Uber, How Uber Works, printed on Sep. 30, 2019 from Internet address https://www.uber.com/us/en/about/how-does-uber-work/, 6 pages.
W. Adi, A. Al-Qayedi, A. A. Zarooni and A. Mabrouk, "Secured multi-identity mobile infrastructure and offline mobile-assisted micropayment application," 2004 IEEE Wireless Communications and Networking Conference (IEEE Cat. No. 04TH8733), 2004, pp. 879-882 vol. 2, doi: 10.1109/WCNC.2004.1311302. (Year: 2004).
Wazeopedia, Main Page, printed on Sep. 30, 2019 from Internet address https://wazeopedia.waze.com/wiki/USA/Main_Page, 3 pages.
White, Ron, "How Computers Work", Que Publishing, 7th Ed, Oct. 15, 2003, p. 4. 23 pages.
Yang, Ming-Hour. "Security enhanced EMV-based mobile payment protocol." TheScientificWorldJournal vol. 2014 (2014): 864571. Doi: 10.115/2014/864571 (Year: 2014).
Kyrillidis; Mayes; Markantonakis, Card-present Transactions on the Internet Using the Smart CardWeb Server, 2013, IEEE, 12th, P616 (Year: 2013).
Urien, P., et al., "A breakthrough for prepaid payment: End to end token exchange and management using secure SSL channels created by EAP-TLS smart cards", 2011 International Conference on Collaboration Technologies and Systems (CTS), 2011. (Year: 2011).
Polito et al., Inter-provider AAA and Billing of VoIP Users with Token-based Method, Dec. 26, 2007, IEEE Xplore, entire document (Year: 2007).

* cited by examiner

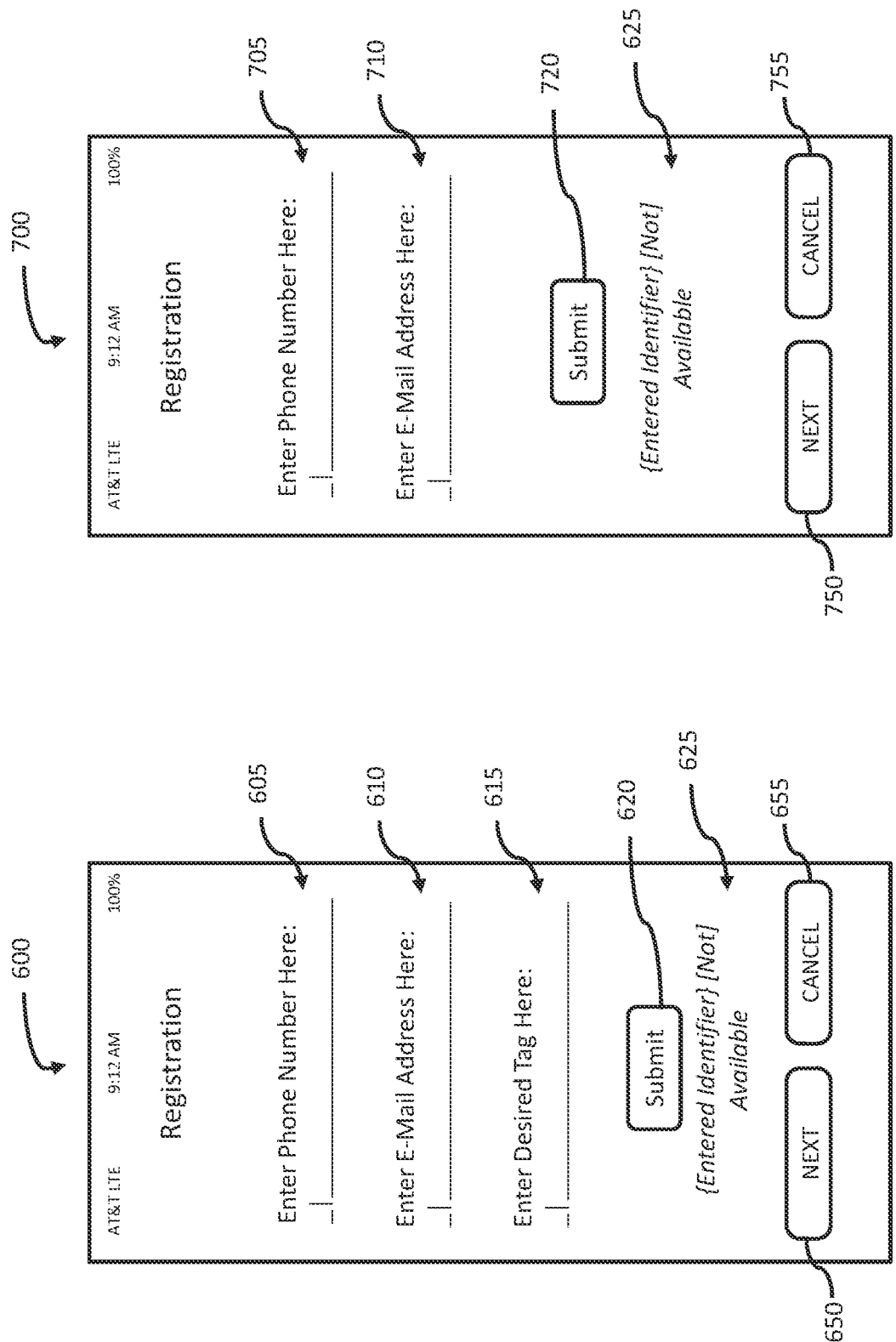

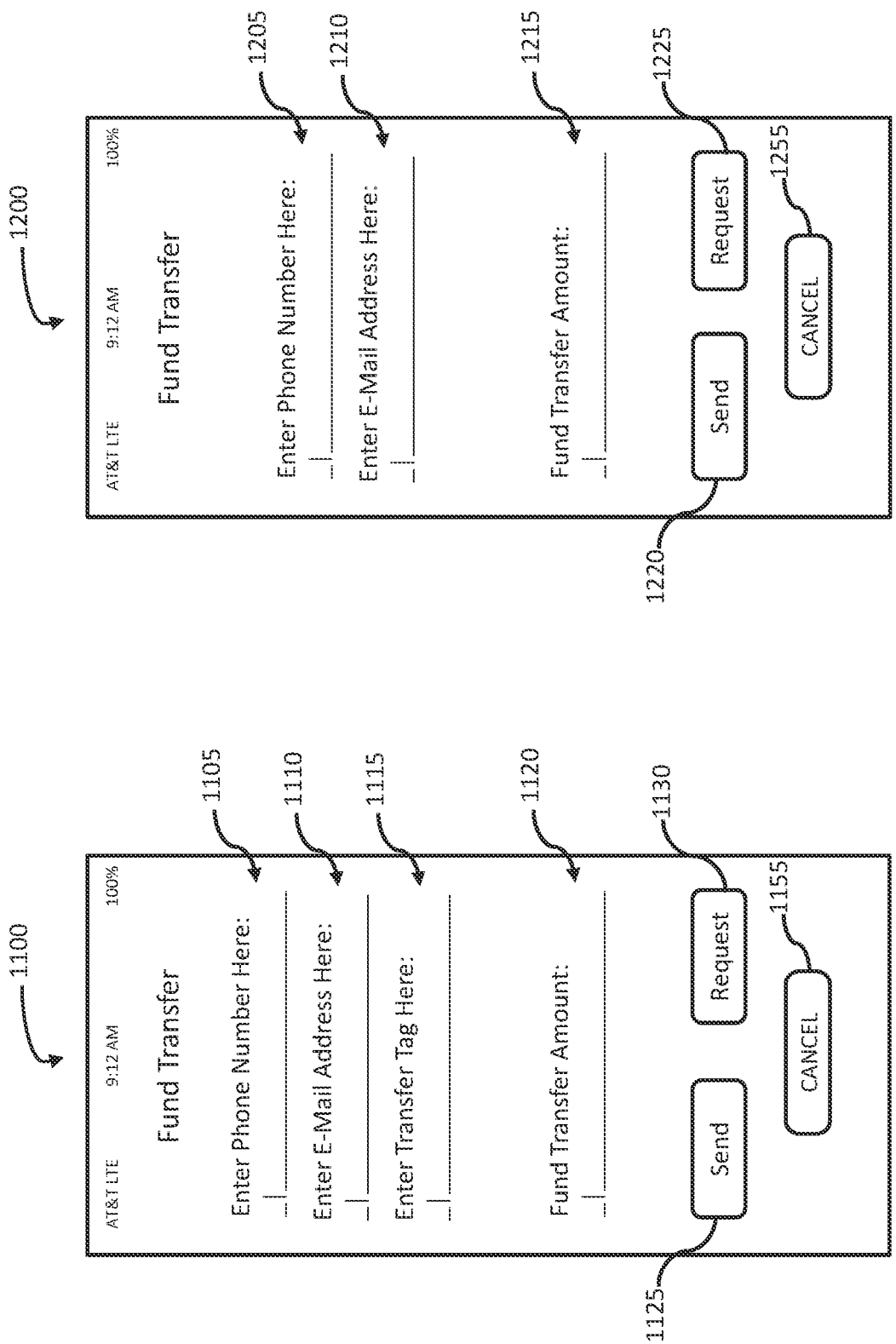

SYSTEMS AND METHODS FOR NATIVE, NON-NATIVE, AND HYBRID REGISTRATION AND USE OF TAGS FOR REAL-TIME SERVICES

CROSS-REFERENCE TO RELATED PATENT APPLICATION

This application claims the benefit of and priority to U.S. Provisional Patent Application No. 63/270,718, titled "SYSTEMS AND METHODS FOR NATIVE, NON-NATIVE, AND HYBRID REGISTRATION AND USE OF TAGS FOR REAL-TIME SERVICES," filed Oct. 22, 2021, which is incorporated herein by reference in its entirety.

TECHNICAL FIELD

The present disclosure relates to improved computer processing systems for real-time services through the use of native, non-native, and hybrid tags.

BACKGROUND

Many different digital transaction platforms exist. However, interoperability between the digital platforms is limited due to, for example, the incompatibility of the data used between the digital platforms. As a more specific example, users can register to engage in transactions (such as funds transfers or payments) through a payment service. Registration with the payment service may include identifying an account as a source of funds for funds transfers. Once registered, the user can partake in funds transfers with other registered users. These transactions may be completed by the user (sender) initiating the transaction with a recipient. However, wide applicability of the system is typically challenging given that registration of the sender and recipient with the system is required. This is especially true in certain instances where users may be reluctant to link their bank account to a non-bank entity digital transaction service. Moreover and even if the users do link their account with the digital transaction service, technical implementation hurdles remain to enable transactions between different entities.

SUMMARY

One embodiment relates to a computer-implemented method. The computer-implemented method includes receiving, by a provider computing system, a transfer tag associated with a recipient from a user device associated with a sender. The computer-implemented method further includes performing, by the provider computing system, a tag conversion process on the transfer tag to create a tag-based identifier corresponding to the transfer tag. The computer-implemented method further includes generating, by the provider computing system, a transfer request including the tag-based identifier. The computer-implemented method further includes sending, by the provider computing system, the transfer request to a transfer service computing system, the transfer request initiating a transfer of a resource to a recipient account of the recipient based on the tag-based identifier.

Another embodiment relates to a computer-implemented method. The computer-implemented method includes receiving, by a provider computing system, a desired transfer tag from a user device. The computer-implemented method further includes performing, by the provider computing system, a tag conversion process on the desired transfer tag to create a desired-tag-based identifier corresponding to the desired transfer tag. The computer-implemented method further comprises registering, by the provider computing system, an account of a user associated with the user device for a transfer service provided by a transfer service computing system using the desired-tag-based identifier.

Still another embodiment relates to a provider computing system. The provider computing system includes one or more processing circuits including one or more processors and one or more memories having instructions stored thereon that, when executed by the one or more processors, cause the one or more processors to receive a transfer tag associated with a recipient from a user device associated with a sender. The instructions, when executed by the one or more processors, further cause the one or more processors to perform a tag conversion process on the transfer tag to create a tag-based identifier corresponding to the transfer tag. The instructions, when executed by the one or more processors, further cause the one or more processors to generate a transfer request including the tag-based identifier. The instructions, when executed by the one or more processors, further cause the one or more processors to send the transfer request to a transfer service computing system, the transfer request initiating a transfer of a resource to a recipient account of the recipient based on the tag-based identifier.

These and other features, together with the organization and manner of operation thereof, will become apparent from the following detailed description and the accompanying drawings. Numerous specific details are provided to impart a thorough understanding of embodiments of the subject matter of the present disclosure. The described features of the subject matter of the present disclosure may be combined in any suitable manner in one or more embodiments and/or implementations. In this regard, one or more features of an aspect of the invention may be combined with one or more features of a different aspect of the invention. Moreover, additional features may be recognized in certain embodiments and/or implementations that may not be present in all embodiments or implementations.

BRIEF DESCRIPTION OF THE FIGURES

FIGS. 6 and 7 depict example graphical user interfaces depicting registration interfaces, according to an example embodiment.

FIGS. 11 and 12 depict graphical user interfaces depicting fund transfer interfaces, according to an example embodiment.

DETAILED DESCRIPTION

Figure 1:
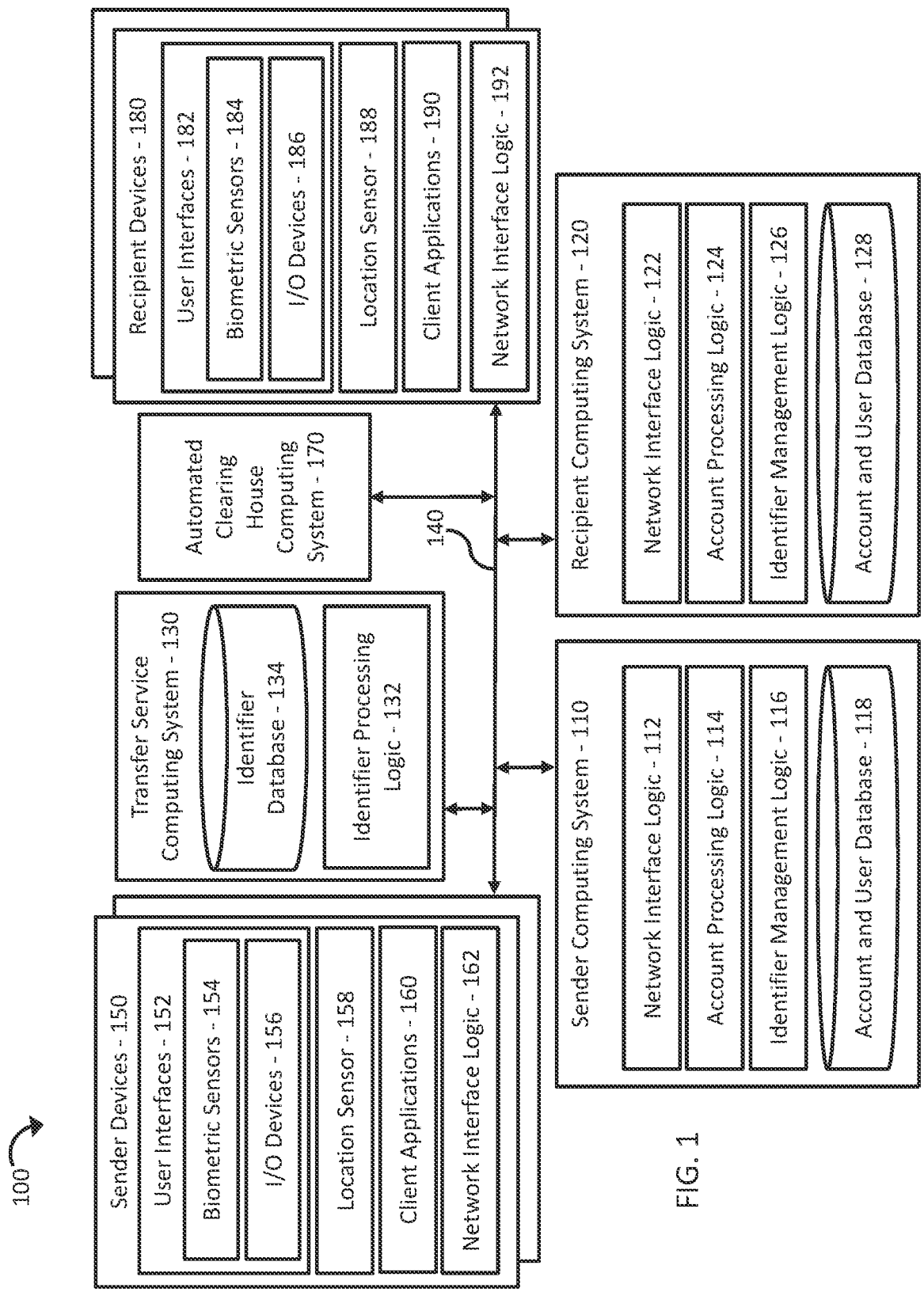
FIG. 1 is a block diagram of a computing system enabling a real-time service via generating and employing transfer tags, according to an example embodiment.

Various embodiments described herein relate to systems, methods, and devices for registering and using various identifiers to effectuate real-time or nearly real-time services involving multiple entities over a network. In one example embodiment, the real-time or nearly real-time service is a fund transfer and, particularly, a person-to-person (P2P) fund transfer. In other example embodiments, different services are contemplated.

As described herein, a real time or nearly real-time transfer service computing system environment includes a transfer service computing system configured to route transfer requests between sender and recipient devices based on one or more registered identifier(s) via a network. Each of the sender and recipient devices are associated with a corresponding sender/recipient computing system that is owned, controlled, managed, and/or operated by a corresponding provider institution (e.g., a financial institution). Each sender/recipient computing system is configured to store account information related to a plurality of customer accounts (e.g., accounts of senders and/or recipients). The sender/recipient computing systems are further configured to receive, store, utilize, and allow users to register or associate one or more of their accounts with certain identifier types (e.g., phone numbers, e-mail addresses, transfer tags) based on a level of implementation of a transfer service provided by the transfer service computing system in the corresponding sender/recipient computing system.

With this in mind and regarding the levels of implementation of the transfer service, the terms "native", "non-native", and "hybrid" are used herein to describe the sender/recipient computing systems as having various different implementation levels of the transfer service. In particular, these terms indicate the varying identifier types that may be used in each sender/recipient computing system application. Accordingly, "native" computing systems are systems that have fully implemented the use of transfer tags locally, and are configured to receive, store, utilize, and associate any of phone numbers, e-mail addresses, and/or transfer tags with users and their accounts. In contrast, "non-native" and "hybrid" computing systems are systems that have not fully implemented the use of transfer tags locally, and are configured only to store, utilize, and associate any of phone numbers and/or e-mail addresses with users and their accounts.

As used herein, the terms "transfer tag" or "tag" are used to describe a string of alphanumeric and/or symbolic characters for association with a given user account. In one embodiment, the user may select the tag during a registration process. Transfer tags are treated as a separate type of identifier (i.e., separate from phone numbers and e-mail addresses) within the transfer service computing environment that may be separately queried within a database of the transfer service computing system (as well as within databases of native systems) to appropriately route transfers, register the user with a given transfer tag, and/or identify a given user based on a transfer tag.

The varying levels of implementation capabilities across the various entities using the transfer service could, if unaddressed, prevent customers of non-native and hybrid computing systems from effectively transferring funds to customers of native computing systems based on the native computing system's customers' transfer tags. Further, it could also prevent customers of non-native and hybrid computing systems from registering their accounts with desired transfer tags. These issues could cause significant customer frustration and potentially result in customers abandoning usage of the transfer service altogether.

However, to account for varying levels of implementation across the various entities using the transfer service, the systems and methods described herein provide a technical solution of utilizing tag-based identifiers, which are shown as e-mail addresses in certain embodiments herein. The tag-based identifiers may correspond to the transfer tags and enable users of non-native and hybrid systems to functionally utilize transfer tags within the system, even though the non-native and hybrid systems have not fully implemented the use of transfer tags locally. Thus, the present disclosure provides for technical interoperability across different computing architectures and functionalities to enable ubiquitous operation across these distinct and different systems. In operation, a specific tag-related domain may be created (e.g., "@fundtag.com"), which may be appended to the transfer tags within the system to create corresponding tag-based identifiers (e.g., tag-based e-mail addresses). These tag-based identifiers may then be utilized by the non-native and hybrid systems without having to fully implement the use of transfer tags locally, because the non-native and hybrid systems are already configured to process e-mail addresses. The transfer service computing system is then further configured to recognize the tag-based identifiers based on the tag-related domain, and to register users and/or route fund transfers based on the tag-based identifiers and/or their corresponding transfer tags interchangeably. For example, if a user registers an account using a transfer tag or a tag-based identifier, the transfer service computing system is configured to automatically create and store an entry in a database indicating an association between (1) the user (e.g., the user's account, a provider institution managing the user's account) and (2) both the transfer tag and the corresponding tag-based identifier. Accordingly, when the transfer service computing system receives future fund transfer requests including either the transfer tag or the corresponding tag-based identifier associated with the user, the transfer service computing system is configured to query the database for the transfer tag or the corresponding tag-based identifier and to route the transfer requests to the user based on either one.

In some instances, users of non-native systems may need to know that, if the user is attempting to register their account with a transfer tag or to send a fund transfer request to a recipient's transfer tag, the user needs to manually append the tag-related domain to the transfer tag to create the tag-based identifier. In some instances, users of non-native systems may be prompted during a registration attempt or a fund transfer request process to manually append the tag-related domain to the transfer tag to create the tag-based identifier. In either case, the non-native system is then configured to receive and handle the tag-based identifier as a normal e-mail address. On the other hand, the hybrid systems may be configured to partially process transfer tags. That is, the hybrid systems are configured to generate modified user interfaces that are configured to receive transfer tags and then automatically convert the received transfer tags to the corresponding tag-based identifiers by appending the tag-related domain. Accordingly, users of the hybrid systems may not be aware that their respective systems have not fully implemented the use of transfer tags locally.

Beneficially, because the transfer service computing system is configured to register users and/or route fund transfers between users based on the tag-based identifiers and the corresponding transfer tags interchangeably, the use of the tag-based identifiers within the transfer service computing environment provides interoperability among the native, non-native, and hybrid systems. Additionally, because the transfer service computing system is configured to register (e.g., create and store an entry indicating an association between the user and a corresponding identifier(s) within a database) the user with both the tag-based identifier and the corresponding transfer tag, regardless of which one the user provides to the transfer service computing system, database management within the transfer service computing environment is improved because the tag-based identifier provides a ubiquitous identifier that is useable across native, non-native, and hybrid systems. The use of this ubiquitous identifier further improves (i.e., reduces) processing times associated with the transfer service computing system routing transfers from senders to recipients, thereby reducing latency and providing faster transfer times for real-time or nearly real-time transfers.

Further, because the transfer service computing system is configured to register the users based on the tag-based identifiers and the corresponding transfer tags interchangeably, users of non-native and hybrid systems are allowed to "claim" a desired transfer tag(s) within the transfer service computing system, such that the claimed transfer tag(s) is no longer available for use by other users, even though the user's systems has not implemented the use of transfer tags locally. The ability for the users of non-native and hybrid systems to claim desired transfer tag(s) prevents these users from having their desired transfer tag(s) claimed by other users before the non-native and hybrid systems fully implement the use of transfer tags locally. Additionally, the ability for the users of non-native and hybrid systems to claim desired transfer tag(s) allows for the users to associate a variety of different accounts with a variety of different transfer tags (e.g., a first customer account is registered with a first transfer tag, a second customer account is registered with a second transfer tag, a third customer account is registered with a third transfer tag). That is, the use of transfer tag(s) provides increased flexibility for users as compared to traditional phone number and e-mail address identifiers. For example, users may generally only have a limited number of phone numbers and/or email addresses available for registering with their various accounts. Conversely, by allowing for users of non-native and hybrid systems to register their accounts using transfer tags, the users are allowed to create and register new, unique transfer tags for as many different accounts as they would like.

Further, because the tag-based identifiers are in a format already used locally by the non-native and/or hybrid computing systems (e.g., an e-mail address), the non-native and hybrid computing systems are configured to use the tag-based identifiers without needing to immediately implement updated software associated using transfer tags locally, thereby allowing for the various computing systems within the transfer service computing environment to gradually implement the use of transfer tags locally and reducing a computational burden placed on the transfer service computing system. That is, in order to implement the updated software, the various sender/recipient computing systems within the transfer service computing environment may each have to pull (i.e., download) the software update from the transfer service computing system over the network. By allowing for a more gradual implementation across the transfer service computing environment, the computational burden placed on the transfer service computing system at any given time is reduced (e.g., by spreading the computation burden over a larger time period).

Referring now to FIG. 1, a real time or nearly real-time transfer service computing environment/system 100 is shown, according to an example embodiment. The system 100 allows for native, non-native, and hybrid registration and use of transfer tags for transfers (namely, payments described herein) according to various embodiments. The system 100 is configured to be utilized by senders to send funds to recipients, by recipients to receive the funds or request funds in a pull payment relationship, and by intermediaries who may apply restrictions or require approval before funds may be transferred. Beneficially, the system 100 facilitates the transfer of funds from senders to receivers without either party sharing information about their financial accounts with each other. This adds security to digital fund transfers. The senders and recipients may be individuals, groups of individuals, organizations, representatives of organizations, and so on. In certain embodiments, a sender may use a bank account as a source of funds. In other embodiments, the sender may use credit cards, debit cards, business credit cards or check cards as the source of funds. The system 100 is configured to be used for both intrabank transfers (i.e., transfers in which the sender and the recipient both have accounts at the same bank and the funds are transferred between the accounts within the same bank) and interbank transfers (i.e., transfers in which the sender and the recipient have accounts at different banks and the funds are transferred between the accounts at different banks).

The system 100 is shown to include a sender computing system 110, a recipient computing system 120, a transfer service computing system 130 of a service provider, sender devices 150 associated with users registering their accounts and/or creating fund transfer requests, an Automated Clearing House (ACH) computing system 170, and recipient devices 180 associated with recipients of fund transfer requests. Each of the above described systems may communicate through a network 140, which may be a wireless and/or wired network, including, for example, one or more of the Internet, Cellular network, Wi-Fi, Wi-Max, a proprietary banking network, and so on. As will be described below, each system and device in system 100 includes, for communicating via network 140, may include a network interface device and network interface logic that may include, for example, program logic that connects the system or device to the network 140 or to other systems and devices. The network interface logic may facilitate secure communications between the bank, the sender, and/or the recipient. The network interface logic may also facilitate communication with other entities, such as other banks, settlement systems, and so on. The network interface logic may include user interface program logic configured to communicate with client applications running on other computing systems and devices, and generate and present web pages to users accessing a computing system over the network 140.

In FIG. 1 and other parts of the description, for sake of discussing example embodiments, it may be assumed that the sender performs a funds transfer from an account maintained by the sender computing system 110 and the receiver receives the funds using an account maintained by the recipient computing system 120. Hence, the sender computing system 110 may be associated with a sender financial institution computing system and the recipient computing system 120 may be associated with a receiver financial institution computing system. It will be appreciated of course that any given bank computer system may operate in different capacities in the context of different fund transfer transactions. Additionally, while examples provided herein may be in the context of a sender requesting a funds transfer to a recipient, it will also be appreciated that a recipient may request a funds transfer from a sender. Further, while examples provided herein may be in the context of funds transfers, the same or similar processes may additionally or alternatively be utilized to enable transfers of a variety of other resources (e.g., documents, software applications, data or other information), as desired for a given application.

The sender devices 150 are configured to be used by users (e.g., a business owner or employee, a consumer, and so on) to initiate, accept, and/or request transactions and interact with banking functions provided through an online banking application or other client application, an online banking area of a website provided by the sender computing system 110 (or the recipient computing system 120), or through an a client application or website provided by the transfer service computing system 130. The sender devices 150, for example, may be or may comprise personal computers (e.g., desktops or laptop computers), smartphones, tablet computers, wearable devices (e.g., smartwatches), smart assistants/smart speakers, a personal digital assistant, a portable gaming device, or other suitable device. In some embodiments, the sender devices 150 may be part of, or may be replaced by, one or more servers, each with one or more processors configured to execute instructions stored in memory. For example, such an arrangement may be utilized if the sender initiating a funds transfer or payment is a merchant such as an online retailer or another organization.

The recipient devices 180 are similarly configured to be used by users (e.g., a business owner or employee, a consumer, and so on) to initiate, accept, and/or request transactions and interact with banking functions provided through an only banking functions provided through an online banking application or other client application, an online banking area of a website provided by the recipient computing system 120 (or the sender computing system 110), or through an a client application or website provided by the transfer service computing system 130. The recipient devices 180, for example, may be or may comprise personal computers (e.g., desktops or laptop computers), smartphones, tablet computers, wearable devices (e.g., smartwatches), smart assistants/smart speakers, a personal digital assistant, a portable gaming device, or other suitable device. In some embodiments, the recipient devices 180 may be part of, or may be replaced by, one or more servers, each with one or more processors configured to execute instructions stored in memory. For example, such an arrangement may be utilized if the recipient accepting a funds transfer or payment is a merchant such as an online retailer or another organization.

A sender and/or recipient may own, operate, control, manage, and/or otherwise be associated with one or more sender and recipient devices 150 and 180, respectively. Sender devices 150 include one or more user interfaces 152 (devices or components that interface with the user), which may include one or more biometric sensors 154 (such as a fingerprint reader, a heart monitor that detects cardiovascular signals, face scanner, an iris scanner, etc.). User interfaces 152 also include input/output ("I/O") devices 156 that provide perceptible outputs (such as display devices with display screens and/or light sources for visually-perceptible elements, an audio speaker for audible elements, and haptics or vibration devices for perceptible signaling via touch, etc.), that capture ambient sights and sounds (such as digital cameras, microphones, etc.), and/or allow the user to provide inputs (such as a touchscreen display, stylus, keyboard, force sensor for sensing pressure on a display screen, etc.).

Sender devices 150 further include one or more location sensors 158 configured to enable the sender device 150 to determine its location relative to, for example, other physical objects or relative to geographic locations. Example location sensors 158 include global positioning system (GPS) devices and other navigation, location, and geolocation devices, digital compasses, gyroscopes and other orientation sensors, as well as proximity sensors or other sensors that allow the sender device 150 to detect the presence and relative distance of nearby objects and devices. The sender devices 150 store in computer memory, and execute ("run") using one or more processors, client applications 160, such as an Internet browser presenting websites, a banking application, an application of a payment platform, and applications provided or authorized by the entity implementing or administering any of the computing systems in system 100. Example client applications may present the user interfaces presented in the figures.

The sender devices 150 further includes network interface logic 162. The network interface logic 162 includes, for example, program logic that connects the sender devices 150 to the network 140. The network interface logic 162 facilitates secure communications between the user and the bank, the sender, and/or the recipient. The network interface logic 162 also facilitates communication with other entities, such as other banks, settlement systems, and so on.

Similarly, recipient devices 180 (which may be, or may comprise, one or more computing devices) include one or more user interfaces 182, which may include one or more biometric sensors 184. User interfaces 182 also include input/output components 186 that provide perceptible outputs that capture ambient sights and sounds and/or allow the user to provide inputs. Recipient devices 180 similarly include one or more location sensors 188 to enable the recipient device 180 to determine its location relative to, for example, other physical objects or relative to geographic locations. The recipient devices 180 also similarly store in computer memory, and execute ("run") using one or more processors, various client applications 190. The recipient devices 180 similarly includes network interface logic 192, which may be substantially similar to the network interface logic 162 of the sender device 150.

The sender devices 150 and recipient devices 180 generate and/or receive and display screens on the I/O devices 156 (e.g., from the sender, recipient, and/or transfer computing systems), 186 including account information, transaction instructions, and so on. In an example embodiment, such screens may be used to request and/or receive a username and password information. Such screens may also be used to prompt the user to provide information regarding the amount of the funds and the identity of the merchant or individual that is to receive the funds. In some instances, such information comprises, for example, a transfer tag, a name, an address, a phone number, an e-mail address, a selection of a recipient from an electronic directory, and/or other information. Such screens may also include screens displaying information regarding past transactions.

The client applications 160 and/or 190 comprise program logic (i.e., stored executable instructions) configured to implement at least some of the functions described herein. The client applications 160 and/or 190 may be downloaded to the sender and recipient devices for execution. Alternatively, the client applications 160 and/or 190 may be hard-coded into the sender and recipient devices. As will be appreciated, the level of functionality that resides on the sender devices 150 and recipient devices 180 as compared to other components of the system 100 may vary depending on the implementation. In some instances, the client application 160 and/or 190 may be a web browser (e.g., "Internet Explorer," "Mozilla Firefox," "Chrome," "Safari," and so on) configured to receive and display web pages received from another component of system 100. The client application may also comprise a mobile web browser, text message (SMS) interface, a dedicated application, or other program suitable for sending and receiving information over the network 140. In some instances, the client applications 160 and/or 190 are managed, operated, updated, maintained, and/or provided to the sender devices 150 and recipient devices 180 by the sender computing system 110, the recipient computing system 120, and/or the transfer service computing system 130.

The sender computing system 110 may be operated by a provider, such as a bank or other financial institution that maintains accounts held by customers (e.g., demand deposit accounts, credit card accounts, home mortgage loans, student loans, and so on). The sender computing system 110, for example, comprises one or more servers each with one or more processors configured to execute instructions stored in memory, send and receive data stored in memory, and perform other operations to implement the operations described herein associated with logic or processes shown in the figures.

The sender computing system 110 includes network interface logic 112, account processing logic 114, identifier management logic 116, and an account and user database 118. The network interface logic 112 includes, for example, program logic that connects the sender computing system 110 to the network 140. The network interface logic 112 facilitates secure communications between the bank and the sender and/or the recipient. The network interface logic 112 also facilitates communication with other entities, such as other banks, settlement systems, and so on. The network interface logic 112 includes user interface program logic configured to generate and present web pages to users accessing the sender computing system 110 over the network 140.

The account processing logic 114 performs account processing to process transactions in connection with the account(s) of the account holder, such as account credits and debits to checking and savings accounts, credits and debits to home mortgage and home equity accounts, credits and debits to student loan accounts, and so on. Thus, whenever funds are transferred into or out of an account of an account holder (e.g., a sender or recipient of funds), the account processing logic 114 is configured to track the transaction and modify an entry/ledger in the user database 118 to reflect the debit or credit. The account processing logic 114 also processes fund transfer requests to transfer funds from a sender using the sender devices 150 to a recipient using the recipient device 180.

The account and user database 118 stores account information (e.g., transaction, information about the account holder, associated identifiers, and so on) for accounts that are maintained by the financial institution (or other non-bank entity) on behalf of its customers. The account and user database 118 is configured to be used by the identifier management logic 116 when an identifier other than a bank account/routing number is used (e.g., an e-mail address, phone number, transfer tag, Universal Payment Identification Code (UPIC), randomly generated number, and so on) to identify a recipient of a funds transfer. That is, the account and user database 118 is configured to allow the sender computing system 110 (particularly, the account processing logic 114 and the identifier management logic 116) to query, convert, or otherwise correlate the recipient's identifier (e.g., cell phone number, e-mail address, transfer tag, or other identifier) to a bank account number/routing number of the recipient's bank account. This arrangement allows the sender to uniquely identify the recipient based on the identifier, without utilization of private/personal information of the recipient (e.g., a recipient's bank account/routing number) for the real-time or nearly real-time transfer.

As an example, the identifier management logic 116 is configured to allow users to register and be added to the account and user database 118 prior to, during, and/or after a transaction. Upon registration, a new entry is created by the identifier management logic 116 for the newly registered user in the account and user database 118. For example, the user may provide one or more identifiers regarding the users that are configured to be shared with other users for using the real-time or nearly real-time transfer service. The "identifier" refers to a user-identifying value. The identifiers may include, for example, a transfer tag, a phone number regarding the user, an e-mail address(es) regarding the user, and so on. As will be described further herein, in some instances, the sender computing system 110 is configured to process differing types of identifiers based on a level of implementation by the sender computing system 110 of a transfer service provided, offered, and/or maintained by the transfer service computing system 130.

In some embodiments, the identifier management logic 116 is configured to accept and process identifiers (e.g., phone numbers, e-mail addresses, and transfer tags) directly. In these instances, as described above, the sender computing system 110 may be considered a native system (e.g., having fully implemented certain features of the transfer service).

In this regard, the phrase "accept and process" used in this context refers to the identifier management logic 116 being configured to receive and utilize an identifier (e.g., phone numbers, e-mail addresses) to perform various operations (e.g., performing queries within the account and user database 118, creating new associations between customer accounts and the identifiers within the account and user database 118). Further, "direct" processing refers to the identifier management logic 116 being configured to receive an identifier and to utilize the identifier to perform the various operations in the form that the identifier is originally received (i.e., if a phone number is received by the identifier management logic 116 from a customer, the identifier management logic 116 is configured to query the account and user database 118 for the phone number and create a new association between the customer's account and the phone number within the account and user database 118).

In some other instances, the identifier management logic 116 is configured to accept and process phone numbers and e-mail addresses directly, but is not configured to process transfer tags (directly or indirectly). In these instances, the sender computing system 110 may be considered a non-native system (e.g., not having fully implemented certain features of the transfer service). In yet some other instances, the identifier management logic 116 is configured to accept and process phone numbers and e-mail addresses directly, and is configured to accept and process transfer tags indirectly. In this context, "indirect" processing refers to the identifier management logic 116 being configured to receive an identifier and, particularly a transfer tag, and convert the identifier to a tag-based identifier to be utilized while performing various operations, as will be described below.

In these instances, the sender computing system 110 may be considered a hybrid system (e.g., not having fully implemented certain features of the transfer service, while still allowing for transfer tags to be utilized). Accordingly, in various embodiments, the sender computing systems 110 of the system 100 are configured as native, non-native, and/or hybrid systems depending on the level of implementation of the transfer service, and are thus configured to accept and process differing types of identifiers. Identifier management logic is discussed in greater detail below in connection with FIG. 2.

In some instances, the sender computing system 110 also generates or otherwise associates an identifier that is securely maintained and that is used to identify the user in the account and user database 118. Herein, such identifiers are referred to as "private identifiers." The private identifier may, for example, be a unique ID associated with the database entry for the user in the account and user database 118, and need not be known by the user with whom it is associated or by other users. In some embodiments, digital tokens comprising or corresponding to public identifiers (e.g., phone numbers, e-mail addresses, transfer tags) and/or private identifiers are generated.

Additionally, in some instances, the account and user database 118, for each user, also stores a registry of other users connected to that user. That is, for each user, a registry may be stored that includes a listing of each other user with whom the user has an established connection. Such connection may be established, for example, the first time that the user sends or receives funds from the other user, or when a tag is established or generated. A connection may also be established by way of a user interface that permits a user to add connections with other users through a lookup service. For each user in the registry, additional information is stored within the account and user database 118, such as their unique ID and/or various other information.

The recipient computing system 120 is configured in a similar manner as the sender computing system 110, with network interface logic 122, account processing logic 124, identifier management logic 126, and account and user database 128. It should be appreciated that the various logic and database components of the recipient computing system 120 may function in a substantially similar manner as the corresponding components of the sender computing system 110 discussed above. As such, it should also be appreciated that any of the various methods and operations of the logic and database components of the sender computing system 110 described herein may be similarly applied to the corresponding components of the recipient computing system 120. For example, similar to the sender computing system 110, in various embodiments, the recipient computing systems 120 of the system 100 are configured as native, non-native, and/or hybrid systems depending on the level of implementation of the transfer service, and are thus configured to accept and process differing types of identifiers.

The transfer service computing system 130 is controlled by, managed by, owned by, and/or otherwise associated with a transfer service entity that is configured to enable real-time or nearly real-time transfers. The transfer service entity may be a financial institution (e.g., a card network) or other entity that supports transfers across multiple different entities (e.g., across different financial institutions). As described herein and in one embodiment, the "transfer" is a payment or fund transfer. However, the present disclosure is also applicable with other types of transfers, such as the secure transfer of information (e.g., documents). The payment or fund transfer may include electronic or digital fund transfers. In some instances, the transfer service entity may, for example, be an entity that is formed as a joint venture between banks and/or other entities that send and receive funds using the fund transfer system 100. As another example, the transfer service entity may be a third party vendor. As still another example, the transfer service entity may be provided by one of the banks, i.e., such that the bank (e.g., the sender computing system 110 and/or the recipient computing system 120) includes and performs both the components and operations described herein as being included in and performed by the sender computing system 110 or the recipient computing system 120, as well as the components and operations described herein as being included in and performed by the transfer service computing system 130.

The transfer service computing system 130 is configured, in various embodiments, to provide (e.g., through its own client application or through integration with a client application of another entity, such as a banking application) at least some of the functionality depicted in the figures and discussed below. Some of that functionality is configured to be provided via identifier processing logic 132. As an example, the transfer service entity provides or hosts a web portal provided for an online community of individuals where such individuals obtain user names/login IDs or otherwise become registered members to enable real-time or nearly real-time transfers between senders and recipients.

Herein, banks or financial institutions associated with computing systems 110 and 120 are "member banks" or "member institutions" that follow established protocols for transferring funds using system 100. For example, in the context of a transfer service that is created as a joint venture, the member banks may include at least the banks that are part owners of the joint venture, as well as potentially other banks. While two member banks are shown in FIG. 1 (i.e., sender computing system 110 and recipient computing system 120), it will be appreciated that there may be additional member banks. Additionally, as previously indicated, non-bank entities may also be members. Additionally, in some instances, members and/or member banks may have varying levels of implementation of various features associated with the transfer service described herein (e.g., account/user identifier processing capabilities). Accordingly and as described herein, the members and/or member banks may be considered native, non-native, or hybrid members based on their respective levels of implementation, as will be described further below.

To allow for varying levels of implementation between the various members, the transfer service computing system 130 is configured to generate and maintain a tag-related domain configured to be specifically recognized and used within the system 100 to allow for users to both register their accounts with transfer tags (i.e., register with the transfer service computing system 130) and to send or receive funds to or from accounts associated with transfer tags, regardless of the level of implementation of their bank's or non-bank entity's computing system. In particular and as described in one embodiment herein, the tag-related domain is an email domain (e.g., "@fundtag.com").

When the sender/recipient computing system 110, 120 is configured as a non-native or hybrid computing system and a user attempts to register an account or transfer funds using a transfer tag, the tag-related domain is appended, either by the user (in the non-native configuration) or automatically (in the hybrid configuration) by the sender/recipient computing system 110, 120, to the end of the transfer tag provided by the user to create a tag-based identifier. For example, if a user's transfer tag is "Happy123" and the e-mail domain is "@fundtag.com," the corresponding converted tag-based identifier is "Happy123@fundtag.com." Accordingly and in addition to registering and processing requests associated with phone numbers, e-mail addresses, and tags directly, the identifier processing logic 132 of the transfer service computing system 130 is further configured to recognize when either a tag or a tag-based identifier is used to register a new user or to transfer funds. Then, regardless of whether a tag or a tag-based identifier is used, the identifier processing logic 132 is configured to register both the tag and the corresponding tag-based identifier within the identifier database 134 and/or process the fund transfer request by identifying the sender or recipient (or the sender/recipient computing system 110, 120) using either of the tag or the corresponding tag-based identifier, as will be described further below.

In some instances, the transfer service provided by the transfer service computing system 130 may also be used by senders and recipients that have bank accounts at non-member banks, for example, by permitting such users to register directly with the transfer service computing system 130. Hence, users do not need to be customers of any particular bank in order to be able to transfer funds via system 100.

In some embodiments, transfer service computing system 130 may, for example, comprise one or more servers, each with one or more processing circuits including one or more processors configured to execute instructions stored in one or more memory devices, send and receive data stored in the one or more memory devices, and perform other operations to implement the operations described herein associated with certain logic and/or processes depicted in the figures. Although not specifically shown, it will be appreciated that the transfer service computing system 130 may include network interface logic, various databases, account processing logic, and other logic in the same or similar manner to the other components of system 100. The network interface logic may include user interface program logic configured to generate and present application pages, web pages, and/or various other data to users accessing the transfer service computing system 130 over the network 140.

The ACH computing system 170 is configured to be used to transmit funds to and from bank accounts of the senders and recipients. As is known, the ACH Network is a nationwide batch oriented electronic funds transfer system which provides for interbank clearing of electronic payments for participating depository financial institutions. An ACH entry may start with an account holder (known as the Receiver in ACH terminology) authorizing an Originator (e.g., a person or a company) to issue ACH debit or credit to an account. Depending on the ACH transaction, the Originator must receive authorization from the Receiver. In accordance with the rules and regulations of ACH, no financial institution may issue an ACH transaction (whether it is debit or credit) towards an account without prior authorization from the Receiver. Once authorization is received, the Originator then creates an ACH entry to be given to an Originating Depository Financial Institution (ODFI), which may be any financial institution that does ACH origination. This ACH entry is then sent to an ACH Operator (i.e., central clearing facilities through which financial institutions transmit or receive ACH entries, e.g., the Federal Reserve or the Electronic Payments Network) and is passed on to the Receiving Depository Financial Institution (RDFI), where the Receiver's account is issued either a credit or debit, depending on the ACH transaction. The RDFI may, however, reject the ACH transaction and return it to the ODFI with the appropriate reason, such as that there were insufficient funds in the account or that the account holder indicated that the transaction was unauthorized. An RDFI has a prescribed amount of time in which to perform returns (e.g., two to sixty days from the receipt of the ACH transaction). An ODFI receiving a return of an ACH entry may re-present the ACH entry two more times, or up to three total times, for settlement. Again, the RDFI may reject the transaction, after which the ODFI may no longer represent the transaction via ACH. The above description of ACH system is one in use currently, the embodiments of the current invention will continue to function similarly even if some methods and steps in the ACH system are modified.

Figure 2:
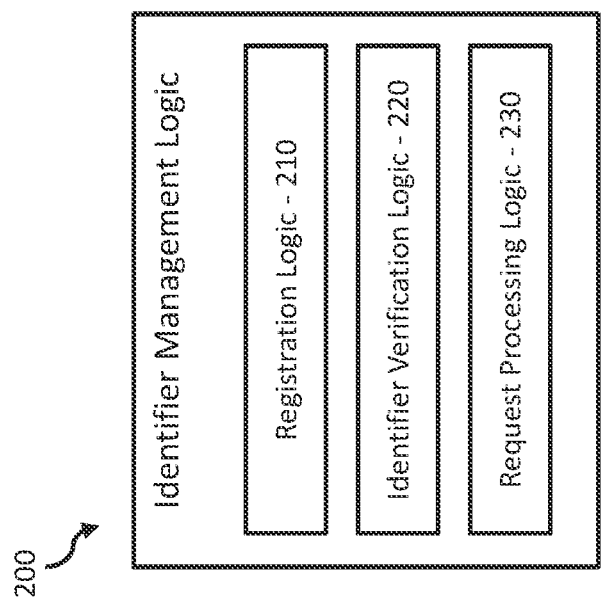
FIG. 2 is a block diagram of an identifier management logic that may manage registered identifiers associated with various users of the system of FIG. 1, according to an example embodiment.

FIG. 2 shows an example identifier management logic 200 in greater detail. The identifier management logic 200 may be substantially similar to the identifier management logic 116 of the sender computing system 110 and/or the identifier management logic 126 of the recipient computing system 120. For example, each identifier management logic depicted in system 100 may include all, or a subset, of the elements shown in FIG. 2. As depicted, the identifier management logic 200 may include registration logic 210, identifier verification logic 220, and request processing logic 230.

The registration logic 210 is configured to register users for the transfer service provided by the transfer computing system and supported by the sender and recipient computing systems. In operation, the registration logic 210 is configured to generate pages or screens (e.g., user interfaces 600, 700 shown in FIGS. 6 and 7) for presentation to the user at the website or client application of a sender device 150 to facilitate the registration process. The registration logic 210 is additionally configured to create new database entries (e.g., within a corresponding account and user database 118, 128) responsive to the registration of various new identifiers by users.

In some instances, the user is required to sign into the client application 160 (or client application 190) provided to the sender device 150 (or the recipient device 180) prior to registration. Accordingly, the registration logic 210 is configured to utilize the user's sign-in information (e.g., username, password) to query the corresponding account and user database 118, 128 to identify the user and the user's account(s) at a provider institution associated with the sender/recipient computing system 110, 120. In some instances, the registration logic 210 is further configured to allow the user to select one account from a plurality of accounts associated with the user to be associated with an identifier(s) provided for registration. That is, if a user is associated with a plurality of accounts within the corresponding account and user database 118, 128, the registration logic 210 is configured to allow the user to select one account of the plurality of accounts to be associated with the provided identifier(s).

In some instances, the registration logic 210 is further configured to share information associated with registration events with the transfer service computing system 130. For example, the registration logic 210 is further configured to send an indication of association between new identifiers and users and/or accounts to the transfer service computing system 130 to be stored within the identifier database 134.

In some other instances, the registration logic 210 is configured to inform the transfer service computing system 130 that a new identifier (or multiple new identifiers) has been registered with a corresponding system (e.g., the sender or recipient computing system 110, 120) without providing any personal information related to the user. In these instances, the transfer service computing system 130 is configured to store an association between the new identifier (or multiple new identifiers) and the corresponding system within the identifier database 134. In some instances, the registration logic 210 is configured to provide certain information (e.g., name, address, other associated phone numbers, other associated e-mails) to the transfer service computing system 130, as desired for a given application.

In any case, as described herein, when a user registers with a tag-based identifier, the transfer service computing system 130 is configured to recognize the tag-based identifier received from the registration logic 210 based on a tag-related domain included within the tag-based identifier. Upon recognizing the tag-based identifier, the transfer service computing system 130 is configured to automatically store an association between the user, account, and/or the corresponding system and both the tag-based identifier and the transfer tag corresponding to the tag-based identifier within the identifier database 134.

The registration logic 210 is configured to accept and/or process various inputs (e.g., identifiers) received from the user during a registration process based on the level of implementation of the transfer service within the corresponding system (e.g., the sender or recipient computing system 110, 120). For example, if the sender or recipient computing system 110, 120 is a native system, the registration logic 210 is configured to receive a phone number, an e-mail address, and/or a desired transfer tag from the user. The registration logic 210 of the native system is then configured to register the user using any of the phone number, the e-mail address and/or the desired transfer tag. That is, the registration logic 210 is configured to associate the user's account(s) with any of the phone number, the e-mail address, and/or the desired transfer tag, and to store this association within the corresponding account and user database 118, 128.

Alternatively, if the sender or recipient computing system 110, 120 is a non-native system, the registration logic 210 is only configured to receive a phone number and/or an e-mail address from the user (i.e., not a transfer tag). The registration logic 210 is then configured to register the user using the phone number and/or the e-mail address from the user by directly associating the user's account(s) with the phone number and/or the e-mail address, and storing this association within the corresponding user database 118, 128. In this case, if the user desires to register their account with a transfer tag for fund transfers, the user may register their account by providing, at least in part, a tag-based e-mail address (i.e., a tag-based identifier) during the registration process.

By providing the tag-based identifier (e.g., the tag-based email address) during the registration process, when the registration logic 210 shares the registration information with the transfer service computing system 130, the transfer service computing system 130 is configured to recognize the tag-related domain and automatically associate the user, account, and/or the corresponding computing system with both the tag-based identifier and the corresponding tag. Accordingly, although the user's account may only be associated with the tag-based identifier (i.e., the tag-based e-mail) in the corresponding account and user database 118, 128, the user's desired transfer tag will still be indirectly registered to their account within the identifier database 134 of the transfer service computing system 130.

The use of the tag-based identifiers and the capability of the transfer service computing system 130 to recognize and identify tags and tag-based identifiers interchangeably allows for the registration of transfer tags by systems having varying levels of capabilities/implementation of the transfer service. Accordingly, users of non-native and hybrid computing systems (i.e., senders and/or recipients having accounts held by corresponding sender/recipient computing systems 110, 120 configured as non-native and hybrid computing systems) are allowed to "claim" transfer tags within the system 100, such that the transfer tags are made unavailable for use and/or registration by other users within the system 100, even though the users' providers' computing systems (e.g., the sender/recipient computing system 110, 120) are not configured to locally associate the user's account with the transfer tag.

That said, in some instances, the non-native systems (i.e., the sender/recipient computing systems 110, 120 configured as non-native systems) require the user to provide the tag-based identifiers to register their account with a transfer tag within the system 100. That is, the provider institutions may inform or otherwise instruct the users on how to create and use the tag-based identifier to register accounts with corresponding transfer tags within the system 100. In some other instances, the registration logic 210 of the non-native systems (i.e., the sender/recipient computing systems 110, 120 configured as non-native systems) is configured to provide a prompt (e.g., provided as a pop-up notification within the client application 160, 190, a push message that links to the client application 160, 190, etc.) to the sender/recipient device 150, 180 associated with the user instructing the user on how to create and use the tag-based identifier to register selected accounts with corresponding transfer tags within the system 100.

On the other hand, if the sender or recipient computing system 110, 120 is hybrid system, the registration logic 210 is configured receive any of a phone number, an e-mail address, and/or a transfer tag from the user during a registration process. If the user enters a phone number or an e-mail address, the registration logic 210 registers the user as discussed above, with respect to the non-native system. However, if the user enters a transfer tag, the registration logic 210 is configured to automatically perform a tag conversion process to create a corresponding tag-based identifier (e.g., a tag-based e-mail address) by automatically appending the tag-related domain to the received transfer tag.

In some instances, the registration logic 210 is configured to receive the tag-related domain from the transfer service computing system 130 prior to the registration process, and to store the tag-related domain within a memory of the registration logic 210, such that the tag-related domain is automatically retrieved from the memory of the registration logic 210 and appended to the transfer tag entered by the user during the registration process. In other instances, the registration logic 210 is configured to transmit a request for a current tag-related domain to the transfer service computing system 130 upon receipt of the transfer tag from the user during the registration process. The registration logic 210 may then receive the current tag-related domain from the transfer service computing system 130 and append the current tag-related domain to the received unique identifier. In this case, if the tag-related domain is changed within the system, the registration logic 210 is configured to ensure that the correct tag-related domain is appended to the received unique identifier. That is, in some instances, the stored tag-related domain is periodically updated by requesting and receiving the current tag-related domain from the transfer service computing system 130 to accommodate changing tag-related domains over time, which may be updated within the transfer service computing system 130 for a variety of reasons.

The registration logic 210 may then associate the tag-based identifier (e.g., the tag-based e-mail address) with the user and/or user's account as it would any other provided e-mail address. That is, although the registration logic 210 of the hybrid system is not configured to process transfer tags as a separate type of identifier to be associated with user accounts, the registration logic 210 is configured to treat the tag-based identifier created using the tag conversion process as an e-mail type identifier (e.g., because the appended tag-related domain is an e-mail domain) configured to be stored, queried, and associated with user accounts in the same way as any other provided e-mail address. However, when the registration logic 210 shares the registration information with the transfer service computing system 130, the transfer service computing system 130 is configured to recognize the tag-related domain and automatically associate the user, account, and/or the corresponding computing system with both the created tag-based identifier and the corresponding transfer tag.

As such, sender and/or recipient computing systems 110, 120 configured as hybrid systems are configured to allow for users (i.e., senders and/or recipients associated with sender devices 150 and/or recipient device 180) to be unaware that the use of transfer tags has not been fully implemented. For example, the registration logic 210 of the hybrid system (i.e., sender and/or recipient computing systems 110, 120 configured as hybrid systems) is configured to provide registration user interfaces to the user that are substantially similar to registration user interfaces provided by the registration logic 210 of native systems (i.e., sender and/or recipient computing systems 110, 120 configured as native systems). That is, the registration user interfaces (e.g., the registration interface 600 shown in FIG. 6) generated and provided by the native and hybrid systems (i.e., sender and/or recipient computing systems 110, 120 configured as native and/or hybrid systems) are each configured to receive transfer tags from users. Accordingly, even though the registration logic 210 of the hybrid systems (i.e., sender and/or recipient computing systems 110, 120 configured as hybrid systems) is not configured to directly associate the transfer tag with the user and/or user's account as a separate type of identifier, the users of the hybrid system may not need to know about and purposefully use tag-based domains (e.g., e-mail addresses) to register their accounts with transfer tags within the system 100.

Accordingly, the hybrid systems (i.e., sender and/or recipient computing systems 110, 120 configured as hybrid systems) provide a variety of benefits and technical advantages. For example, by eliminating the need for the user to manually append the tag-related domain, the hybrid system reduces the likelihood of entry errors, thereby improving the reliability of successful transfers. Further, by converting the transfer tag to a tag-based identifier that the hybrid systems (i.e., sender and/or recipient computing systems 110, 120 configured as hybrid systems) are already configured to process (e.g., a tag-based e-mail address), the converted tag-based identifier may be utilized without fully implementing the use of transfer tags, thereby reducing associated computational requirements imposed on the sender and/or recipient computing systems 110, 120 configured as hybrid systems (as compared to being configured as native systems), while still allowing the users to register their accounts with transfer tags and to transfer funds to recipients using transfer tags.

In some instances, prior to associating the new identifier(s) with the user and/or user's account, the identifier management logic 200 is configured to first verify the identifier(s) provided by the user. Verification refers to analyzing the identifier to confirm the availability of the identifier with the transfer service so that multiple of the same identifier are not used, which may create confusion and incorrect transfers. For example, the identifier verification logic 220 is configured to verify that the identifier(s) provided by the user are acceptable (i.e., meet one or more predefined format requirements) and have not already been registered by another user and/or for another account. As an example, when a user enters a transfer tag, the identifier verification logic 220 may determine that the transfer tag is acceptable (e.g., satisfies known conventions for number and types of alphanumeric and/or symbolic characters and does not include offensive language) and is unique (e.g., by cross-referencing a directory of transfer tags). For example, the identifier verification logic 220 is configured to cross-reference the corresponding account and user database 118, 128 and/or communicate with the transfer service computing system 130 to determine whether the provided identifier(s) have already been registered and associated with any other users, user accounts, and/or sender or recipient computing systems 110, 120 within the system 100.

In some instances, when a user attempts to register a new identifier, the identifier verification logic 220 is configured to perform an authentication operation such as sending the user a text, an e-mail at a newly-provided e-mail address, or, in the case of a transfer tag, an e-mail or text to a previously-registered identifier associated with the user's account. The text and/or e-mail may, for example, contain a link that must be accessed by the user in order to successfully complete the registration process. Accordingly, the registration logic 210 and the identifier verification logic 220 are configured to cooperate to facilitate the registration of certain identifiers.

The request processing logic 230 is configured to facilitate the creation, acceptance, and/or processing of real-time or nearly real-time transfer requests. For example, the request processing logic 230 is configured to generate pages or screens (e.g., user interfaces 1100, 1200 shown in FIGS. 11 and 12) for presentation to the user at the website or client application to facilitate the creation and/or acceptance of various fund transfer requests.

In some instances, the request processing logic 230 is configured to generate a fund transfer request based on one or more inputs provided by a user. For example, the request processing logic 230 is configured to receive a recipient identifier, a desired fund amount, and an indication of whether the user is requesting or sending money. The request processing logic 230 is then configured to generate and send the fund transfer request over the network, which may include the dynamically received information from the sender of, for example, the recipient identifier, the desired fund amount, and the indication of that the user is sending money (or, requesting money in another embodiment), to the transfer service computing system 130 to be routed to the recipient based on the recipient identifier. In some embodiments, the fund transfer request is configured as a payload data packet that includes information regarding the transfer. In other embodiment, the fund transfer request is configured as multiple payload packets thereby adding security to the process such that interception of one packet may be insufficient to effectuate a transfer without the other payload packets. Similar to the registration logic 210, the request processing logic 230 is configured to accept and/or process differing types of recipient identifiers received from the user based on the level of implementation of the transfer service within the corresponding system (e.g., the sender or recipient computing system 110, 120).

For example, if the sender computing system 110 is a native system, the request processing logic 230 is configured to receive a phone number, an e-mail address, and/or a transfer tag of the intended recipient from the user via a generated user interface provided to the sender device 150 by the client application 160 during a native fund transfer process. The request processing logic 230 of the native system is then configured to generate and transmit a fund transfer request to the transfer service computing system 130 to be routed to the appropriate recipient computing device and/or recipient user device based on the recipient identifier(s) provided by the user.

Alternatively, if the sender computing system 110 is configured as a non-native system, the request processing logic 230 is only configured to receive a phone number and/or an e-mail address of the intended recipient (i.e., not a transfer tag) via the generated user interface provided to the sender device 150 by the client application 160 during a non-native fund transfer process. Accordingly, if the recipient has a registered phone number and/or e-mail address, the user may provide the phone number and/or the e-mail address, as discussed above with respect to the native system. However, if the user desires to send a fund transfer request to a recipient having a registered transfer tag for fund transfers, the user may provide the tag-based identifier corresponding to the recipient's transfer tag into the generated user interface during the non-native fund transfer process.

When the user provides the corresponding tag-based identifier of the recipient and the request processing logic 230 sends the fund transfer request to the transfer service computing system 130, the transfer service computing system 130 is configured to recognize the tag-related domain and identify the recipient within the identifier database 134 based on either the tag-based identifier or the corresponding transfer tag. Accordingly, even though the non-native system has not fully implemented the use of transfer tags, the user is still allowed to send fund transfer requests to recipients based on their transfer tags by providing the corresponding tag-based identifier (e.g., the tag-based e-mail address). It will be appreciated that the use of the tag-based identifier and the capability of the transfer service computing system 130 to recognize and identify tags and tag-based identifiers interchangeably allows for funds transfers between systems having varying levels of implementation of the transfer service.

On the other hand, if the sender or recipient computing system 110, 120 is a hybrid system, the request processing logic 230 is configured to receive a phone number, an e-mail address, and/or a transfer tag of the intended recipient from the user via a generated user interface provided to the sender device 150 by the client application 160 during a hybrid fund transfer process. If the user enters a phone number or an e-mail address, the request processing logic 230 creates and sends the fund transfer request as discussed above, with respect to the native and non-native systems. However, similar to the registration logic 210, if the user enters a transfer tag, the request processing logic 230 is configured to automatically perform a tag conversion process to create a corresponding tag-based identifier (e.g., tag-based e-mail address) by automatically appending the tag-related domain to the received transfer tag prior to creating the fund transfer request. The request processing logic 230 then creates the fund transfer request using the created tag-based identifier (e.g., tag-based e-mail address) in a similar manner as if the identifier provided was a recipient e-mail address. Accordingly, the transfer service computing system 130 is similarly configured to recognize the tag-related domain and identify the recipient within the identifier database 134 based on either the tag-based identifier or the corresponding transfer tag. Accordingly, even though the request processing logic 230 is embodied in a hybrid computing system that is not configured to create and send fund transfer requests directly utilizing transfer tags of intended recipients, the users of the hybrid system do not need to know about and purposefully use the tag-based identifiers to create and send fund transfer requests to intended recipients based on the intended recipients' transfer tags within the system 100.

Figure 3:
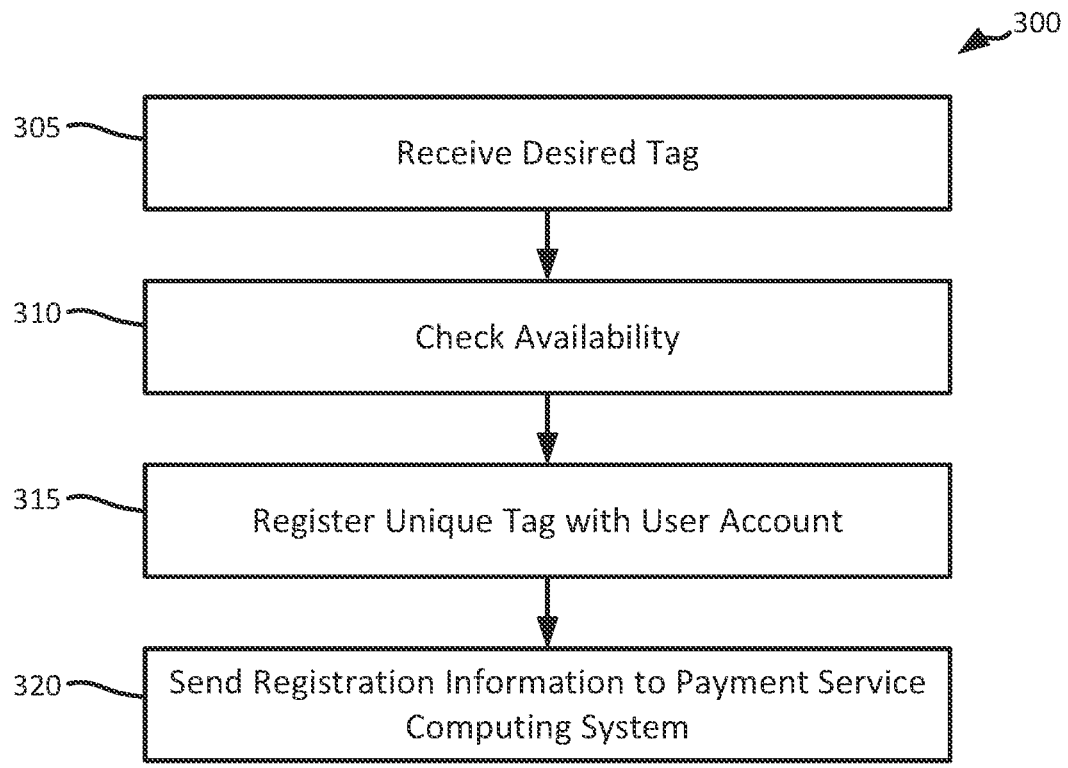
FIG. 3 is a flow diagram of a method for a native registration process, according to an example embodiment.
Figure 4:
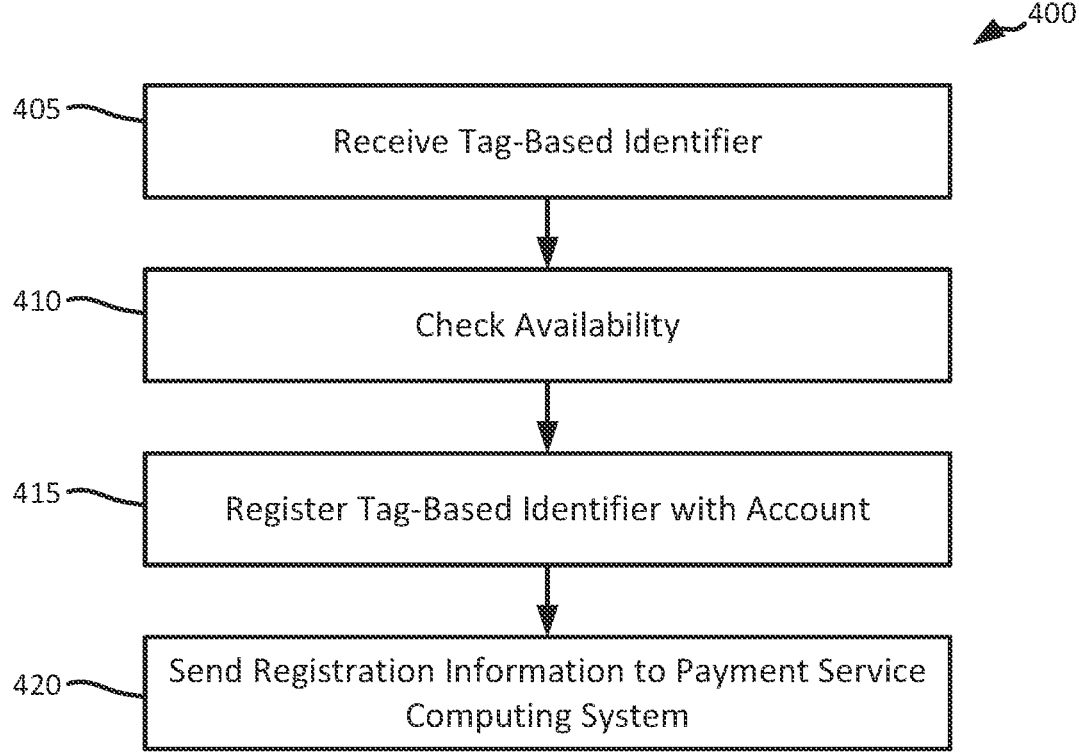
FIG. 4 is a flow diagram of a method for a non-native registration process, according to an example embodiment.
Figure 5:
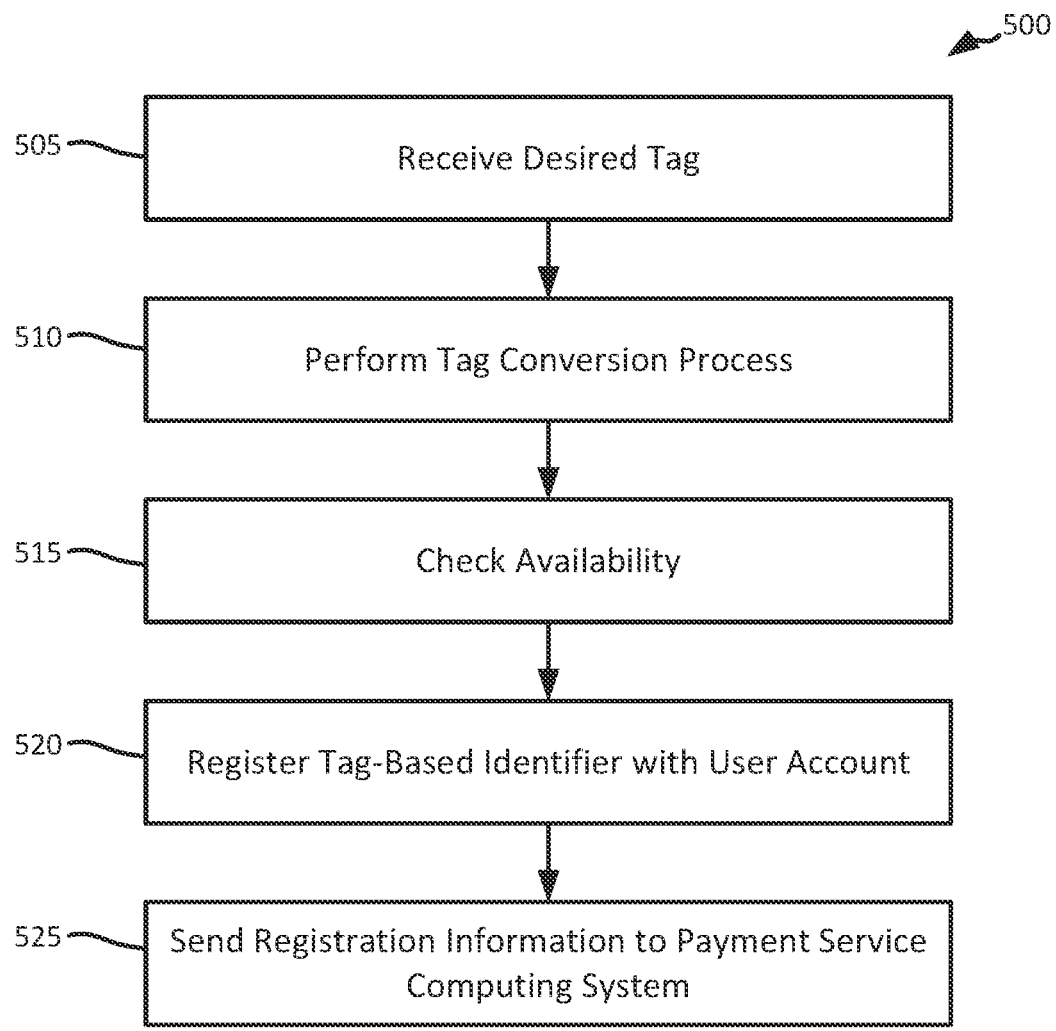
FIG. 5 is a flow diagram of a method for a hybrid, non-native registration process, according to an example embodiment.

Referring now to FIGS. 3, 4, and 5, example methods for registering a transfer tag for fund transfers with system 100 via native systems (a native registration process 300), non-native systems (a non-native registration process 400), and hybrid, non-native systems (a hybrid, non-native registration process 500) are shown. It should be appreciated that the various method steps shown and described are provided as an example, and, in some instances, various additional steps may be performed and/or some of the described steps may be omitted, without departing from the scope of the present disclosure. Additionally, it should be appreciated that the following methods specifically refer to a tag-based identifier in the form of a tag-based e-mail address including a tag-related e-mail domain. However, it should be appreciated that various other types of tag-based identifiers may be implemented including various other types of tag-related domains.

Further, it should be appreciated that, in some instances, prior to the following registration processes, the client application 160, 190 generates a sign-in screen and receives a credential of the user (e.g., username, password, biometric, a combination thereof, etc.). The client application 160, 190 then authenticates the credential to allow access other features of the client application 160, 190. After the user is signed in, the client application 160, 190 presents the user with a graphical user interface including a main menu of the client application 160, 190. From the main menu, the user may select an option to begin the registration process via the graphical user interface. In some instances, the client application 160, 190 is configured to identify and provide a plurality of accounts stored within the account and user database 118, 128 of the sender/recipient computing system 110, 120 that are associated with the user based on the received credential of the user. The client application 160, 190 is then configured to allow the user to select one or more of the provided accounts associated with the user that they would like to register using the registration processes discussed below.

Referring first to FIG. 3, a native registration process 300 of a user registering their account with a transfer tag via a sender/recipient computing system 110, 120 configured as a native computing system is shown, according to an example embodiment. At process 305, the registration logic 210 receives a transfer service registration request including the transfer tag. For example, the user may enter a desired tag into a user interface (e.g., registration interface 600 shown in FIG. 6) generated by the sender/recipient device 150, 180, the sender/recipient computing system 110, 120, or the transfer service computing system 130 and provided to the sender/recipient device 150/180. The registration logic 210 then checks the availability of the transfer tag at process 310. That is, the identifier verification logic 220 is configured to cross-reference the corresponding account and user database 118, 128 and/or communicate with the transfer service computing system 130 to determine whether the desired tag has already been registered and associated with any other users, user accounts, and/or sender or recipient computing systems 110, 120 within the system 100.

If the desired tag is available, the registration logic 210 may provide an indication to the user via one or more graphical user interfaces (e.g., "Congrats—you have now obtained this tag!"). The registration logic 210 then registers the transfer tag with the user's account and stores an association between the transfer tag and the user's account within the corresponding account and user database 118, 128, at process 315. The registration logic 210 then communicates various registration information with the transfer service computing system 130, at process 320. For example, the registration logic 210 may provide an indication to the transfer service computing system 130 specifying the transfer tag and indicating various associated identifying information. In some instances, the identifying information includes the user's name, the user's contact information, the user's account information, and/or an identifier associated with the computing system of the corresponding member entity that the user is associated with. In some instances, the identifying information only includes the identifier associated with the computing system of the corresponding member entity that the user is associated with, such that no personal information pertaining to the user is shared with the transfer service computing system 130.

In any case, the transfer service computing system 130 is configured to store the registration information within the identifier database 134 to be used in further fund transfer request routing processes. Additionally, the transfer service computing system 130 is configured to recognize a transfer tag is included within the registration information and automatically associate both the transfer tag and the corresponding tag-related identifier (e.g., the tag-related e-mail address) with the provided identifying information within the identifier database 134. For example, in some instances, upon receiving registration information including an e-mail address identifier, the transfer service computing system 130 is configured to identify and compare an e-mail domain name (e.g., "@gmail.com," "@yahoo.com," "@fundtag.com") to the tag-related e-mail domain (e.g., "@fundtag.com") to determine whether the received e-mail address contains the tag-related e-mail domain. Accordingly, by comparing the e-mail domain name with the tag-related e-mail domain, the transfer service computing system 130 is configured to recognize (e.g., determine) that the received e-mail address contains the tag-related e-mail domain.

Referring now to FIG. 4, a non-native registration process 400 of a user registering their account with a transfer tag via a sender/recipient computing system 110, 120 configured as a non-native system is shown, according to an example embodiment. At process 405, using the sender/recipient computing system 110, 120 configured as a non-native system, when a user wants to register their account with a transfer tag, the user provides, and the registration logic 210 receives, a transfer service registration request including a corresponding tag-based identifier (e.g., a tag-based e-mail address) from the user. That is, the user provides the corresponding tag-based identifier associated with their desired tag (e.g., by appending the tag-related domain) by entering the tag-based identifier into a user interface (e.g., registration interface 700 shown in FIG. 7) provided to the sender device 150 (or the recipient device 180). For example, if the desired tag of the user is "John128" and the tag-related domain is "@fundtag.com," the corresponding tag-based e-mail address would be "John128@fundtag.com". The registration logic 210 may then check the availability of the tag-based identifier, at process 410. That is, the identifier verification logic 220 may cross-reference the corresponding account and user database 118, 128 and communicate with the transfer service computing system 130 to determine whether the tag-based identifier (and thus the desired tag) has already been registered and associated with any other users, user accounts, and/or sender or recipient computing systems 110, 120 within the system 100.

In some instances, if the desired tag (and/or corresponding tag-based identifier) is available, the client application 160, 190 is configured to generate and provide a confirmation screen to the user via the sender/recipient device 150, 180 including an indication that the desired transfer tag (and/or corresponding tag-based identifier) is available within the system 100. In some instances, the confirmation screen further includes a selectable accept option button and a selectable reject or cancel option button configured to allow the user to input a selection to accept or reject the desired tag and/or corresponding tag-based identifier.

In some instances, the confirmation screen is configured by the client application 160, 190 with a time-out period, within which the user must accept or reject the desired tag and/or tag-based identifier. That is, within the time-out period, the system 100 (e.g., the sender computing system 110, the recipient computing system 120, the transfer service computing system 130) is configured to temporarily treat or hold the desired tag and/or tag-based identifier in a "claimed" state, such that the desired tag and/or tag-based identifier is temporarily made unavailable to other users of the system 100 for registration with other accounts. For example, the sender/recipient computing systems 110, 120 and the transfer service computing system 130 may create temporary entries within each of the account and user databases 118, 128 and the identifier database 134 temporarily associating an account of the user with the desired tag and/or tag-based identifier. Upon expiration of the time-out period, the system 100 is configured to return the desired tag and/or tag-based identifier to an "available" state, such that the desired tag and/or tag-based identifier is again made available to other users of the system 100 for registration with other accounts. For example, upon expiration of the time-out period, the sender/recipient computing systems 110, 120 and the transfer service computing system 130 are configured to erase the temporary entries from within each of the account and user databases 118, 128 and the identifier database 134.

Upon acceptance by the user, the registration logic 210 is then configured to register the tag-based identifier with the user's account and store an association between the tag-based identifier and the user's account within the corresponding account and user database 118, 128, at process 415. The registration logic 210 may then similarly communicate various registration information with the transfer service computing system 130, at process 420. For example, the registration logic 210 may provide an indication to the transfer service computing system 130 specifying the tag-based identifier and indicating the various associated identifying information discussed above. However, the transfer service computing system 130 may recognize the tag-related domain within the tag-based identifier, and automatically associate both the tag-based identifier address and the transfer tag with the provided identifying information within the identifier database 134. Accordingly, even though the system of the member entity that the user's account is held at is not a native system, the user is still able to register their account with a desired tag within transfer service provided by the transfer service computing system 130.

Referring now to FIG. 5, a hybrid, non-native registration process 500 of a user registering their account with a transfer tag via a sender/recipient computing system 110, 120 configured as a hybrid system is shown, according to an example embodiment. As depicted, similar to the sender/recipient computing systems configured as native systems, the registration logic 210 of the sender/recipient computing systems 110, 120 configured as hybrid systems is configured to receive a transfer service registration request including a desired tag directly from the user, at process 505. That is, the user may directly provide their desired tag into a user interface (e.g., registration interface 600 shown in FIG. 6) provided to the sender device 150 (or the recipient device 180) by the client application 160, 190.

However, after receiving the desired tag, the registration logic 210 is then configured to automatically perform the tag conversion process discussed above at process 510. That is, the registration logic 210 is configured to automatically append the tag-related domain to the end of the desired tag entered by the user to create the corresponding tag-related identifier (e.g., tag-based e-mail address). For example, if the user enters the desired tag "John128" and the tag-related domain is "@fundtag.com," the registration logic 210 is configured to append or otherwise add the tag-related domain to the end of the desired tag to create the corresponding tag-related identifier "John128@fundtag.com".

In some instances, the registration logic 210 is configured to retrievably store the tag-related domain within the account and user database 118, 128 (or another database within the sender/recipient computing system 110, 120). Accordingly, when performing the tag conversion process discussed above, the registration logic 210 is configured to retrieve the tag-related domain from the account and user database 118, 128 and to append the tag-related domain to the received desired tag. In some other instances, the tag-related domain may be stored locally within a local memory of the sender/recipient device 150, 180. In these instances, the client application 160, 190 is configured to perform the tag conversion process on the sender/recipient device 150, 180 by querying the local memory for the stored tag-related domain and appending the tag-related domain to the desired tag. In these instances, the client application 160, 190 is configured to provide or otherwise transmit the created tag-based identifier from the sender/recipient device 150/180 to the registration logic 210 of the corresponding sender/recipient computing system 110, 120. In some instances, the stored tag-related domain within the local memory of the sender/recipient device 150, 180 may be periodically updated by the transfer service computing system 130 to accommodate changing tag-based domains over time, which may be updated within the transfer service computing system 130 for a variety of reasons.

In any case, once the created tag-based identifier has been created, the registration logic 210 then similarly checks the availability of the tag-based identifier, at process 515, by cross-referencing the corresponding account and user database 118, 128 and communicating with the transfer service computing system 130. In some instances, the registration logic 210 (or the client application 160, 190) performing the tag conversion process creates a uniform identifier type that is capable of being utilized across all systems (i.e., sender/recipient computing systems 110, 120 and transfer service computing system 130). Accordingly, in some instances, the sender/recipient computing systems 110, 120 and the transfer service computing system 130 are collectively configured to perform necessary queries (e.g., for identifier users, user accounts, available identifiers) utilizing a uniform type of identifier (e.g., an e-mail based identifier), thereby reducing processing times of the queries performed by the sender/recipient computing systems 110, 120 and/or the transfer service computing system 130.

If the desired tag is available, the registration logic 210 then similarly registers the tag-based identifier with the user's account and stores an association between the tag-based identifier and the user's account within the corresponding account and user database 118, 128, at process 520, and communicates the various registration information with the transfer service computing system 130, at process 525. Again, the transfer service computing system 130 similarly recognizes the tag-related domain within the tag-based e-mail address, and automatically associates both the tag-related identifier and the transfer tag with the provided identifying information within the identifier database 134.

Accordingly, the systems and methods described herein allow for users of native, non-native, and hybrid systems to each effectively register their accounts with desired tags, regardless of the level of implementation of the transfer service within the computing systems of their respective member entities.

Referring now to FIGS. 6 and 7, examples of potential graphical user interfaces which may be presented by a client application (e.g., a banking application, a standalone application of a payment platform such as "Zelle®," or an internet web browser) during a registration process are shown. These are representative, non-limited example interfaces, and do not necessarily include all potential functionality of various embodiments. Similarly, not all the functionality depicted is necessarily required in all embodiments.

FIG. 6 shows a registration interface 600 that may be provided to a user of a sender/recipient computing system 110, 120 configured as a native or a hybrid computing system, according to an example embodiment. For example, in some instances, the registration interface 600 is generated by the corresponding sender/recipient computing system 110, 120 or the transfer service computing system 130 and provided to the sender/recipient device 150, 180 via the corresponding client application 160, 190. As illustrated, the registration interface 600 allows for the user to register their account by providing various identifiers. Specifically, the registration interface 600 includes a phone number field 605, an e-mail address field 610, and a desired tag field 615. Accordingly, the user may enter one or more of a phone number, an e-mail address, and/or a desired tag and select a submit button 620. The entered identifier is then transmitted to the corresponding sender/recipient computing system 110, 120 and/or the transfer service computing system 130 to be searched or queried, as discussed above, and an indication 625 is provided as to whether the entered identifier is or is not available for use. The user may select a next button 650 to proceed or a cancel button 655 to cancel registration of their account.

In some instances, if the sender is a user associated with a hybrid computing system and the entered identifier is a desired transfer tag, the client application 160, 190 is configured to perform the tag conversion process locally on the sender/recipient device 180, prior to transmitting the desired transfer tag to the corresponding sender/recipient computing system 110, 120 and/or the transfer service computing system 130. In some other instances, the client application 160, 190 is alternatively configured to send the desired transfer tag to the corresponding sender/recipient computing system 110, 120 without performing the tag conversion process. In these instances, the sender/recipient computing system 110, 120 is configured to perform the tag conversion process to create the corresponding tag-based identifier to be searched and queried, as discussed above.

FIG. 7 shows a registration interface 700 that may be provided to a user of sender/recipient computing system 110, 120 configured as a non-native computing system, according to an example embodiment. For example, in some instances, the registration interface 700 is similarly generated by the corresponding sender/recipient computing system 110, 120 or the transfer service computing system 130 and provided to the sender/recipient device 150, 180 via the corresponding client application 160, 190. As illustrated, the registration interface 700 similarly allows for the user to register their account by provided various identifiers. However, the registration interface 700 only includes a phone number field 605 and an e-mail address field 610. Accordingly, the user may enter one or more of a phone number or an e-mail address (e.g., a pre-existing e-mail address or a tag-based e-mail address corresponding to a desired tag), and select a submit button 720. The entered identifier may then be searched, as discussed above, and an indication 725 may be provided as to whether the entered identifier is or is not available for use. The user may then similarly select a next button 750 to proceed or a cancel button 755 to cancel registration of their account.

Figure 8:
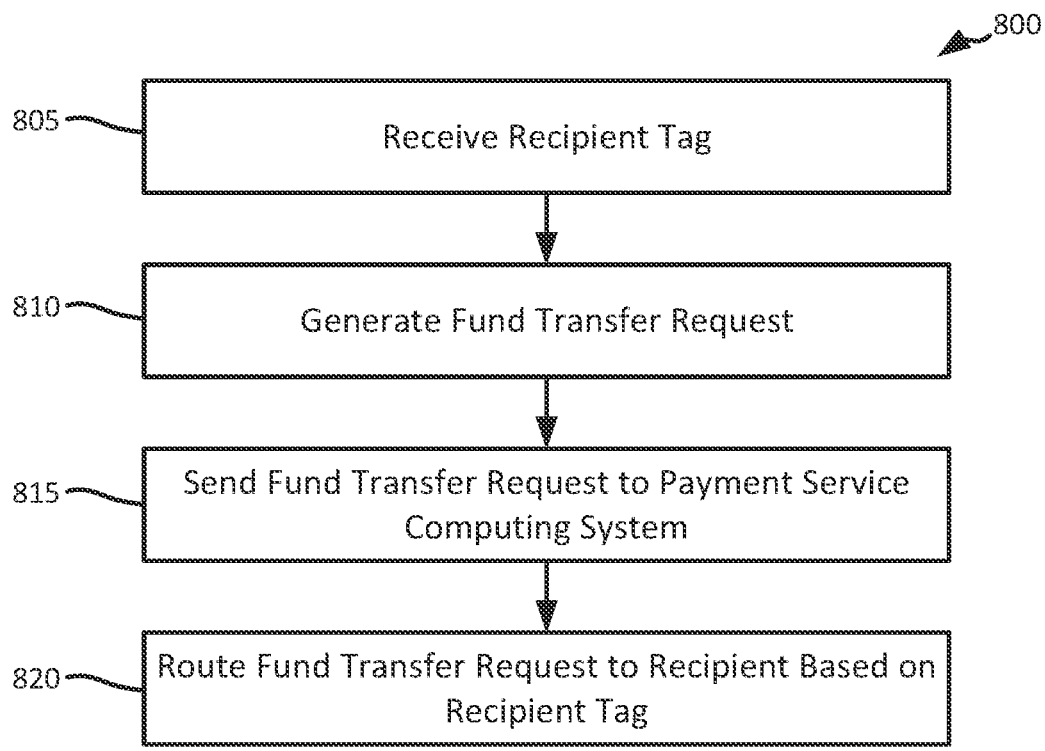
FIG. 8 is a flow diagram of a method for a native transfer process, according to an example embodiment.
Figure 9:
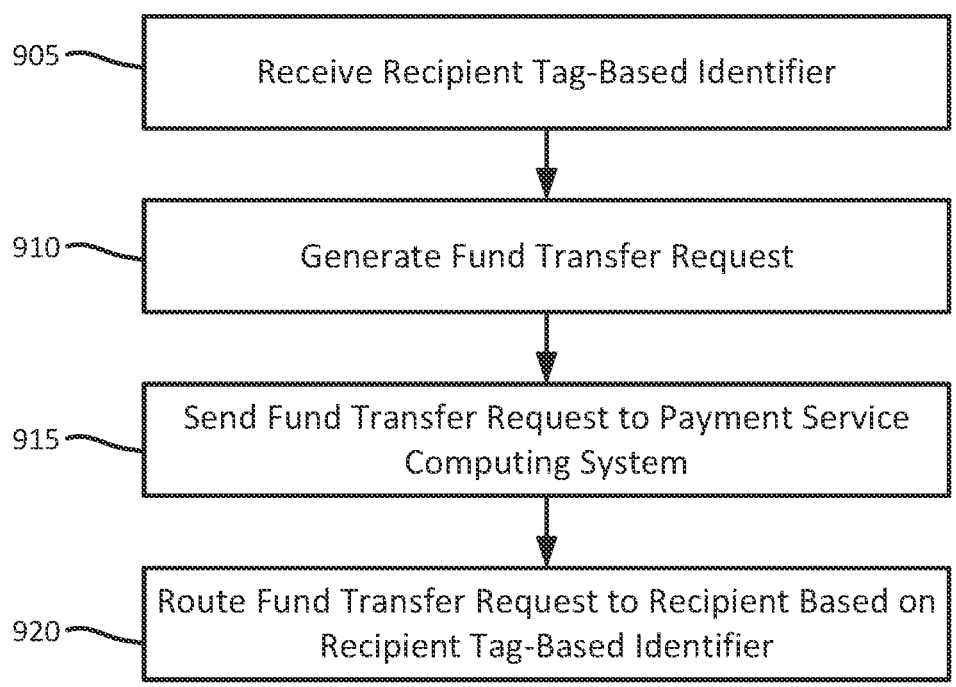
FIG. 9 is a flow diagram of a method for a non-native transfer process, according to an example embodiment.
Figure 10:
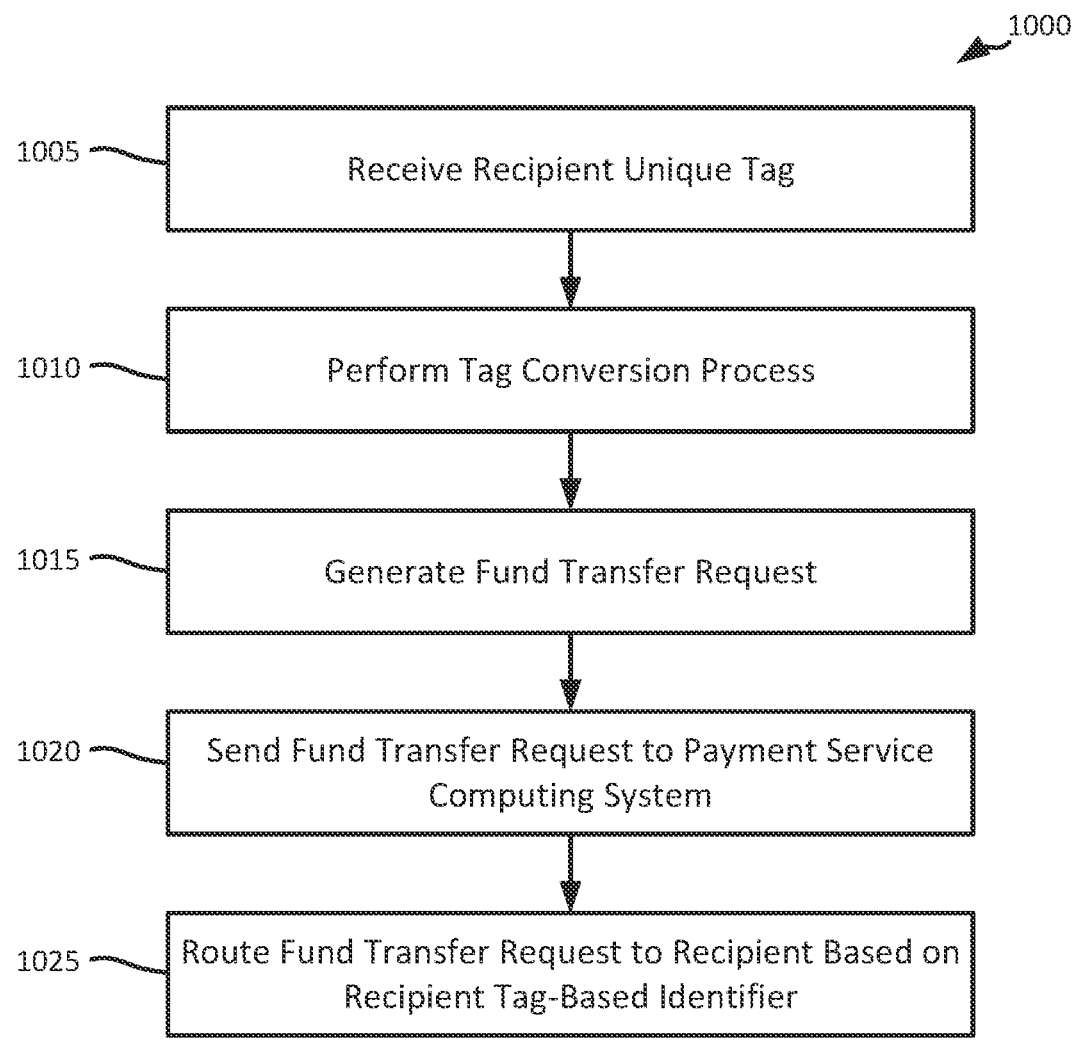
FIG. 10 is a flow diagram of a method for a hybrid, non-native transfer process, according to an example embodiment.

Referring now to FIGS. 8, 9, and 10, example methods for enabling real-time or nearly real-time transfers using transfer tags with the system 100 via native systems (native fund transfer process 800), non-native systems (non-native fund transfer process 900), and hybrid systems (hybrid fund transfer process 1000) are shown. It should be appreciated that the various method steps or processes shown and described are provided as an example, and, in some instances, various additional steps or processes may be performed and/or some of the described steps or processes may be omitted, without departing from the scope of the present disclosure.

It should be appreciated that, in some instances, prior to the following fund transfer request processes, the user is required to sign into the corresponding client application 160, 190 on the sender/recipient device 150, 180. Upon signing in, the user is presented with a graphical user interface providing a main menu of the client application 160, 190. From the main menu, the user may select an option to begin a fund transfer process via the graphical user interface.

For example, FIG. 8 shows a native fund transfer request process 800 of a user creating a fund transfer request based on a transfer tag of a request recipient (e.g., a requested sender or recipient of funds to be transferred) via a sender/recipient computing system 110, 120 configured as a native system, according to an example embodiment. As depicted, the request processing logic 230 receives the transfer tag from the sender device 150 (or the recipient device 180), at process 805. For example, the user may enter a transfer tag into a user interface (e.g., fund transfer interface 1100 shown in FIG. 11) provided to the sender device 150 (or the recipient device 180). The request processing logic 230 then generates a fund transfer request based on the transfer tag, at process 810. As discussed above, the fund transfer request may include the transfer tag, the desired fund amount, and the indication of whether the user is requesting or sending money.

The request processing logic 230 then sends the fund transfer request to the transfer service computing system 130, at process 815, which then routes the fund transfer request to the request recipient based on the transfer tag, at process 820. It should be appreciated that, even if the request recipient has an account maintained by a non-native or hybrid system (i.e., a sender/recipient computing system 110, 120 configured as a non-native or hybrid computing system), the transfer service computing system 130 is configured to recognize that the fund transfer request includes a transfer tag, and thus identify and route the fund transfer request to the request recipient based on the corresponding tag-based identifier (e.g., tag-based e-mail address) associated with the request recipient.

FIG. 9 shows a non-native fund transfer request process 900 of a user creating a fund transfer request based on a transfer tag of a request recipient via a sender/recipient computing system 110, 120 configured as a non-native system, according to an example embodiment. As depicted, the request processing logic 230 receives a recipient tag-based e-mail address, at process 905. For example, the user may append the tag-related domain to the desired recipient's transfer tag to create the tag-based identifier (e.g., tag-based e-mail address), and may enter the created tag-based identifier into a user interface (e.g., fund transfer interface 1200 shown in FIG. 12) provided to the sender device 150 (or the recipient device 180). The request processing logic 230 then generates a fund transfer request based on the tag-based identifier, at process 910. As discussed above, the fund transfer request may include the tag-based identifier, the desired fund amount, and the indication of whether the user is requesting or sending money.

The request processing logic 230 then sends the fund transfer request to the transfer service computing system 130, at process 915, which then routes the fund transfer request to the request recipient based on the tag-based identifier, at process 920. It should be appreciated that, even if the request recipient is a user of a native system, the transfer service computing system 130 (e.g., the identifier processing logic 132) is configured to recognize that the fund transfer request includes a tag-based identifier based on the tag-related domain, and thus identify and route the fund transfer request to the request recipient based on the corresponding transfer tag associated with the request recipient. For example, in some instances, upon receiving a funds transfer request including an e-mail address identifier, the transfer service computing system 130 (e.g., the identifier processing logic 132) is configured to identify and compare an e-mail domain name (e.g., "@gmail.com," "@yahoo.com," "@fundtag.com") to the tag-related e-mail domain (e.g., "@fundtag.com") to determine whether the received e-mail address contains the tag-related e-mail domain. Accordingly, by comparing the e-mail domain name with the tag-related e-mail domain, the transfer service computing system 130 (e.g., the identifier processing logic 132) is configured to recognize (e.g., determine) that the received e-mail address contains the tag-related e-mail domain. In some instances, the tag-related e-mail domain (e.g., "@fundtag.com") is stored within the identifier database 134 and accessible by the identifier processing logic 132 to be retrieved and compared to the e-mail domain name of the e-mail address within the fund transfer request.

FIG. 10 shows a hybrid fund transfer request process 1000 of a user creating a fund transfer request based on a transfer tag of a request recipient via a sender/recipient computing system 110, 120 configured as a hybrid computing system, according to an example embodiment. As depicted, the request processing logic 230 receives a transfer tag of the request recipient, at process 1005. For example, the user may similarly enter the transfer tag into a user interface (e.g., fund transfer interface 1100 shown in FIG. 11) provided to the sender device 150 (or the recipient device 180). In some instances, the request processing logic 230 then automatically performs the tag conversion process, at process 1010, by appending the tag-related domain to the end of the transfer tag to create the corresponding tag-based identifier (e.g., tag-based e-mail address). In some other instances, the client application 160, 190 operating on the sender/recipient device 150, 180 performs the tag conversion process prior to sending the tag-based identifier to the sender/recipient computing system 110, 120. The request processing logic 230 then generates a fund transfer request based on the created tag-based identifier, at process 1015. As discussed above, the fund transfer request may similarly include the tag-based identifier, the desired fund amount, and the indication of whether the user is requesting or sending money.

The request processing logic 230 then sends the fund transfer request to the transfer service computing system 130, at process 1020, which then routes the fund transfer request to the requested recipient based on the tag-based e-mail address, at process 1025. It should again be appreciated that, even if the request recipient is a user of a native system, the transfer service computing system 130 is configured to recognize that the fund transfer request includes a tag-based identifier based on the tag-related domain, and thus identify and route the fund transfer request to the request recipient based on the corresponding transfer tag associated with the request recipient.

Referring now to FIGS. 11 and 12, examples of potential graphical user interfaces which may be presented by a client application (e.g., a banking application, a standalone application of a payment platform, which may be a P2P platform such as "Zelle®," or an internet web browser) during a fund transfer request process are shown. These are representative, non-limited example interfaces, and do not necessarily include all potential functionality of various embodiments. Similarly, not all the functionality depicted is necessarily required in all embodiments.

FIG. 11 shows a fund transfer interface 1100 that may be provided to a user of a sender/recipient computing system 110, 120 configured as a native or a hybrid computing system, according to an example embodiment. For example, in some instances, the fund transfer interface 1100 is generated by the corresponding sender/recipient computing system 110, 120 or the transfer service computing system 130 and provided to the sender/recipient device 150, 180 via the corresponding client application 160, 190. As illustrated, the fund transfer interface 1100 allows for the user to create a fund transfer request based on various identifiers. Specifically, the fund transfer interface 1100 includes a phone number field 1105, an e-mail address field 1110, and a transfer tag field 1115. The fund transfer interface 1100 further includes a fund transfer amount field 1120. Accordingly, the user may enter one or more of a phone number, an e-mail address, and/or a transfer tag associated with the intended recipient, as well as the intended fund transfer amount, and may then select either a send button 1125 or a request button 1130 to create the fund transfer request. The user may alternatively select a cancel button 1155 to cancel the fund transfer request.

FIG. 12 shows a fund transfer interface 1200 that may be provided to a user of a sender/recipient computing system 110, 120 configured as a non-native computing system, according to an example embodiment. For example, in some instances, the fund transfer interface 1200 is similarly generated by the corresponding sender/recipient computing system 110, 120 or the transfer service computing system 130 and provided to the sender/recipient device 150, 180 via the corresponding client application 160, 190. As illustrated, the fund transfer interface 1200 similarly allows for the user to create a fund transfer request based on various identifiers. However, the fund transfer interface 1200 only includes a phone number field 1205 and an e-mail address field 1210 (i.e., no transfer tag field). The fund transfer interface 1200 further includes a fund transfer amount field 1215. Accordingly, the user may enter one or more of a phone number or an e-mail address (e.g., a pre-existing e-mail address or a tag-based e-mail address corresponding to a transfer tag), as well as the intended fund transfer amount, and may then select either a send button 1220 or a request button 1225 to create the fund transfer request. The user may alternatively select a cancel button 1255 to cancel the fund transfer request.

It should be appreciated that, in some instances, one or more sender computing systems 110 have a different level(s) of implementation of the transfer service as compared to one or more recipient computing systems 120. That is, in some instances, one or more sender computing systems 110 are configured as native systems and one or more recipient computing systems 120 are configured as non-native or hybrid systems, and/or vice versa. As described herein, the use of the tag-based identifiers within the sender and/or recipient computing systems 110, 120, in combination with the ability of the transfer service computing system 130 (e.g., the identifier processing logic 132) to recognize both tag-based identifiers and the corresponding transfer tags interchangeably, allows for senders and recipients of the sender and/or recipient computing systems 110, 120 to register their accounts with and send fund transfer requests based on transfer tags and/or the corresponding tag-based identifiers regardless of the differing levels of implementation of the transfer service across the various sender and recipient computing systems 110, 120 within the system 100.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "logic" may include hardware and machine-readable media storing instructions thereon for configuring the hardware to execute the functions described herein. The logic may be embodied as one or more circuitry components including, but not limited to, processing circuitry, network interfaces, peripheral devices, input devices, output devices, sensors, etc. In some embodiments, logic may take the form of one or more analog circuits, electronic circuits (e.g., integrated circuits (IC), discrete circuits, system on a chip (SOCs) circuits, etc.), telecommunication circuits, hybrid circuits, and any other type of circuit. In this regard, the "logic" may include any type of component for accomplishing or facilitating achievement of the operations described herein. For example, logic as described herein may include one or more transistors, logic gates (e.g., NAND, AND, NOR, OR, XOR, NOT, XNOR, etc.), resistors, multiplexers, registers, capacitors, inductors, diodes, wiring, and so on).

Thus and based on the forgoing, the "logic" may be embodied as one or more processing circuits comprising one or more processors communicatively coupled to one or more memory or memory devices. In this regard, the one or more processors may execute instructions stored in the memory or may execute instructions otherwise accessible to the one or more processors. The one or more processors may be constructed in a manner sufficient to perform at least the operations described herein. In some embodiments, the one or more processors may be shared by multiple "logics" (e.g., logic A and logic B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more suitable processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given "logic" or components thereof may be disposed locally (e.g., as part of a local server, a local computing system, etc.) or remotely (e.g., as part of a remote server such as a cloud based server). To that end, "logic" as described herein may include components that are distributed across one or more locations.

An example system for providing the overall system or portions of the embodiments might include one or more computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method, comprising:
   receiving, by a provider computing system, a transfer tag associated with a recipient from a user device associated with a sender;
   performing, by the provider computing system, a tag conversion process on the transfer tag to create a tag-based identifier corresponding to the transfer tag;
   generating, by the provider computing system, a transfer request including the tag-based identifier; and
   sending, by the provider computing system, the transfer request to a transfer service computing system, the transfer request initiating a transfer of a resource to a recipient account of the recipient based on the tag-based identifier.

2. The computer-implemented method of claim 1, wherein the tag-based identifier includes a tag-related domain that enables identification of the recipient account based on the transfer tag.

3. The computer-implemented method of claim 2, wherein performing the tag conversion process comprises automatically appending the tag-related domain to the transfer tag to create the tag-based identifier.

4. The computer-implemented method of claim 2, further comprising:
   transmitting, by the provider computing system, a request for a current tag-related domain from the transfer service computing system; and
   receiving, by the provider computing system, the current tag-related domain from the transfer service computing system, wherein the tag-related domain included in the tag-based identifier is the current tag-related domain.

5. The computer-implemented method of claim 2, wherein the tag-based identifier is an e-mail address and the tag-related domain is an e-mail domain.

6. The computer-implemented method of claim 1, further comprising:
   receiving, by the provider computing system, a desired transfer tag from the user device;
   performing, by the provider computing system, the tag conversion process on the desired transfer tag to create a desired-tag-based identifier corresponding to the desired transfer tag; and
   registering, by the provider computing system, a sender account of the sender for a transfer service provided by the transfer service computing system using the desired-tag-based identifier.

7. The computer-implemented method of claim 6, wherein the desired-tag-based identifier enables identification of the sender account based on the desired transfer tag.

8. The computer-implemented method of claim 7, wherein registering the sender account with the desired-tag-based identifier creates an association between the sender account and both of the desired transfer tag and the desired-tag-based identifier.

9. A provider computing system comprising:
   one or more processing circuits including one or more processors and one or more memories having instructions stored thereon that, when executed by the one or more processors, cause the one or more processors to:
   receive a transfer tag associated with a recipient from a user device associated with a sender;
   perform a tag conversion process on the transfer tag to create a tag-based identifier corresponding to the transfer tag;
   generate a transfer request including the tag-based identifier; and
   send the transfer request to a transfer service computing system, the transfer request initiating a transfer of a resource to a recipient account of the recipient based on the tag-based identifier.

10. The provider computing system of claim 9, wherein the tag-based identifier includes a tag-related domain that enables identification of the recipient account based on the transfer tag.

11. The provider computing system of claim 10, wherein performing the tag conversion process comprises automatically appending the tag-related domain to the transfer tag to create the tag-based identifier.

12. The provider computing system of claim 10, wherein the instructions, when executed by the one or more processors, further cause the one or more processors to:
   transmit a request for a current tag-related domain from the transfer service computing system; and
   receive the current tag-related domain from the transfer service computing system,
   wherein the tag-related domain included in the tag-based identifier is the current tag-related domain.

13. The provider computing system of claim 10, wherein the tag-based identifier is an e-mail address and the tag-related domain is an e-mail domain.

14. The provider computing system of claim 9, wherein the instructions, when executed by the one or more processors, further cause the one or more processors to:
   receive a desired transfer tag from the user device;
   perform the tag conversion process on the desired transfer tag to create a desired-tag-based identifier corresponding to the desired transfer tag; and
   register a sender account of the sender for a transfer service provided by the transfer service computing system using the desired-tag-based identifier.

* * * * *